US010744782B2

(12) United States Patent
Miyazawa

(10) Patent No.: US 10,744,782 B2
(45) Date of Patent: Aug. 18, 2020

(54) STORAGE MEDIUM STORING COMPUTER-READABLE INSTRUCTIONS FOR CAUSING INFORMATION-PROCESSING APPARATUS TO GENERATE AND OUTPUT SCREEN DATA REPRESENTING SCREEN RELATED TO SETTINGS OF REFERENCE VALUE

(71) Applicant: BROTHER KOGYO KABUSHIKI KAISHA, Nagoya-shi, Aichi-ken (JP)

(72) Inventor: Masafumi Miyazawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 16/354,527

(22) Filed: Mar. 15, 2019

(65) Prior Publication Data

US 2019/0299645 A1 Oct. 3, 2019

(30) Foreign Application Priority Data

Mar. 29, 2018 (JP) .................................. 2018-065069

(51) Int. Cl.
*B41J 2/175* (2006.01)
*G06F 3/12* (2006.01)

(52) U.S. Cl.
CPC ....... *B41J 2/17566* (2013.01); *B41J 2/17509* (2013.01); *B41J 2/17546* (2013.01);
(Continued)

(58) Field of Classification Search
CPC ............... B41J 2/17566; B41J 2/17596; B41J 2/17546; B41J 2/17509; B41J 2/175; G06F 3/1234; G06F 3/1219
See application file for complete search history.

(56) References Cited

U.S. PATENT DOCUMENTS

2004/0114177 A1* 6/2004 Matsugi ................. G06Q 30/04
358/1.15
2008/0127226 A1* 5/2008 Fujita .................... G06F 13/102
719/321

FOREIGN PATENT DOCUMENTS

JP 2003-15477 A 1/2003

OTHER PUBLICATIONS

IP.com search (Year: 2020).*

* cited by examiner

*Primary Examiner* — Lisa Solomon
(74) *Attorney, Agent, or Firm* — Merchant & Gould P.C.

(57) ABSTRACT

A non-transitory computer-readable storage medium stores program instructions for an information-processing apparatus including a processor. The program instructions, when executed by the processor, causes the information-processing apparatus to perform: determining whether selected printing devices all have the same type; and generating and outputting, on the basis of determination results, screen data representing a screen regarding settings of reference values for the selected printing devices. Each of the reference values is used to determine whether a replenishment condition for the corresponding printing device is met. When all of the selected printing devices have the same type, the generating generates first screen data representing a first screen through which a single instruction common to all to the reference values can inputted. When not all of the selected printing devices have the same type, the generating generates second screen data representing a second screen through which the single common instruction cannot be inputted.

19 Claims, 15 Drawing Sheets

(52) U.S. Cl.
CPC ........ *B41J 2/17596* (2013.01); *G06F 3/1219* (2013.01); *G06F 3/1234* (2013.01)

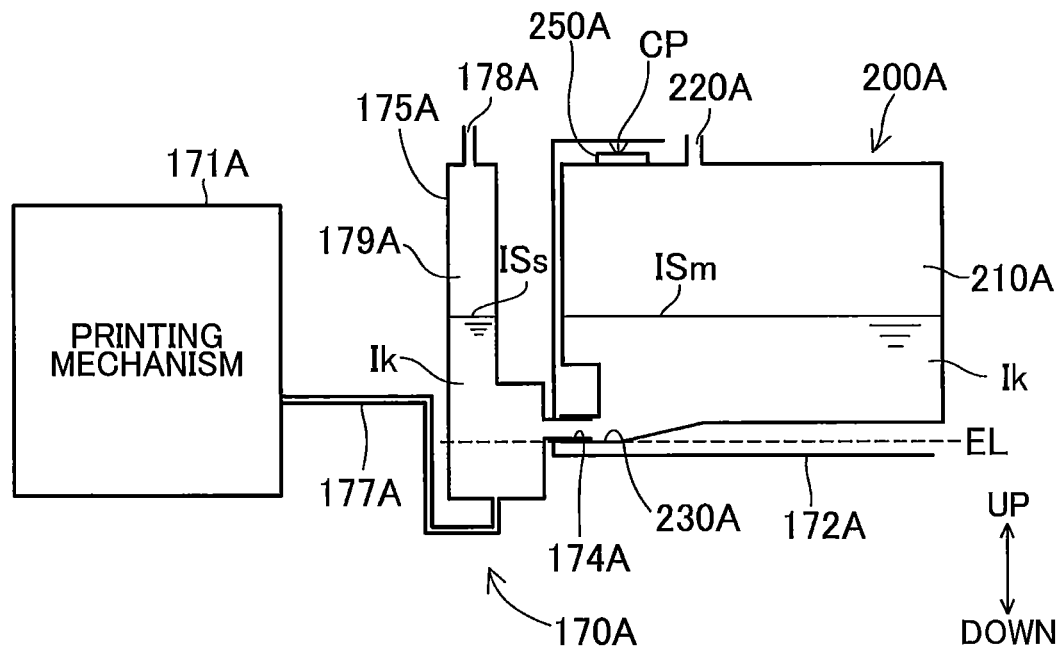
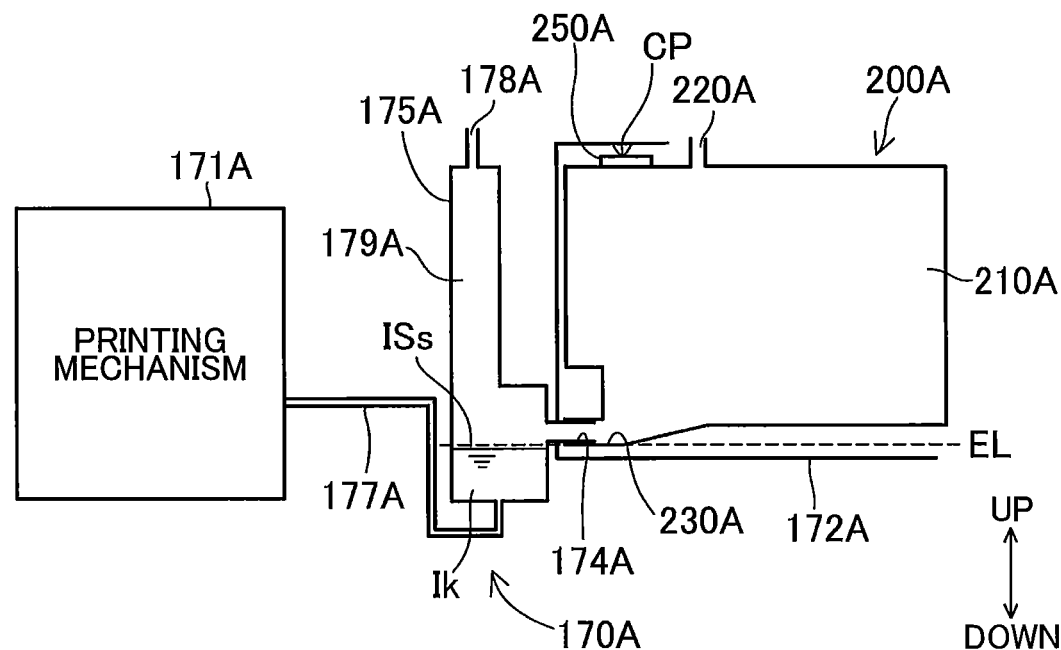

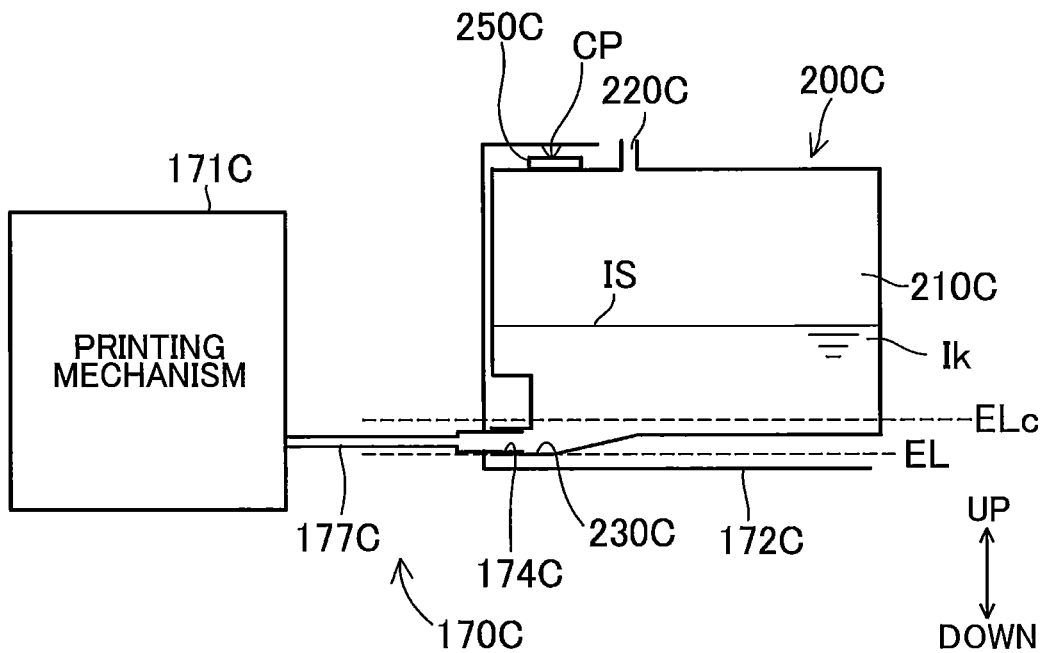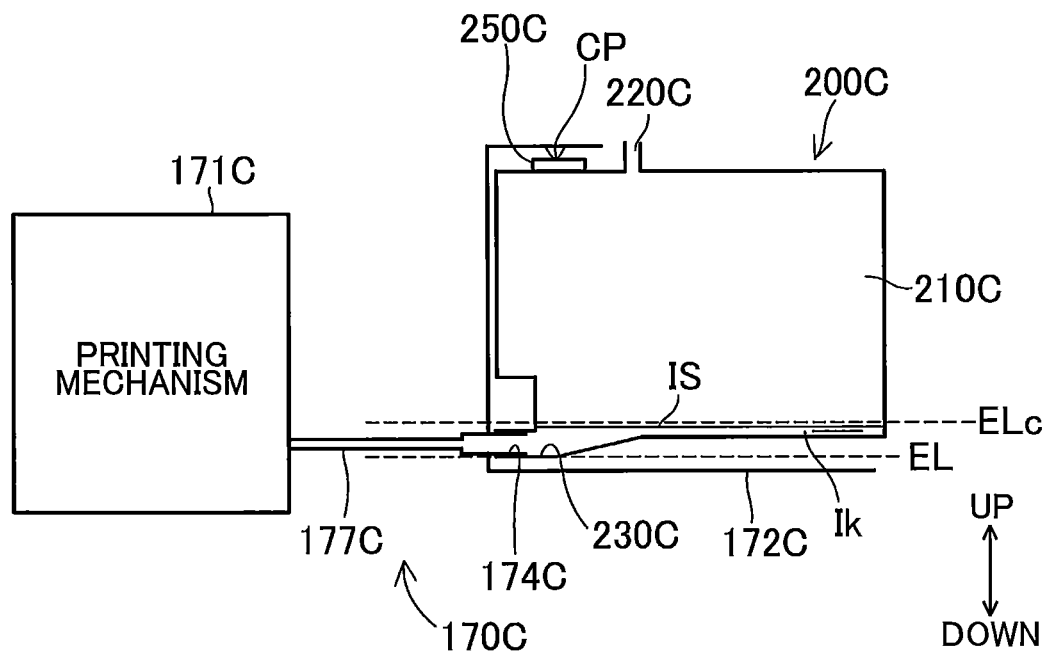

FIG. 4
FIRST EMBODIMENT

MANAGEMENT DATABASE PD

| | SERIAL NUMBER | MODEL NAME | IP ADDRESS | ACQUIRED STATUS | DETERMINED STATUS | REPLACEMENT COUNT | INK SUPPLY SYSTEM | INITIAL INK VOLUME IV | BOUNDARY INK VOLUME BV | RESIDUAL INK PERCENTAGE IR | REFERENCE RESIDUAL PERCENTAGE TR |
|---|---|---|---|---|---|---|---|---|---|---|---|
| EN1 | AAABBB | MDL_200 | IP_A | NORMAL | | 2 | DOUBLE | 1000 | 200 | 40 | |
| EN2 | CCCDDD | MDL_250 | IP_B | NORMAL | LOW | 3 | DOUBLE | 2000 | 100 | 25 | 30 |
| EN3 | GGGHHH | MDL_500 | IP_C | LOW | LOW | 3 | SINGLE | 4000 | | 5 | 20 |

...

FIRST EMBODIMENT

FIG. 6

| | MANAGEMENT LIST | | | | ML |
|---|---|---|---|---|---|
| | SERIAL NUMBER | MODEL NAME | IP ADDRESS | STATUS | |
| L1 | AAABBB | MDL_200 | IP_A | NORMAL | |
| L2 | CCCDDD | MDL_250 | IP_B | NORMAL | |
| L3 | GGGHHH | MDL_500 | IP_C | LOW | |

CS

DELETION
UPDATING — SW
REFERENCE VALUE SETTING

UP
↑
↓
DOWN

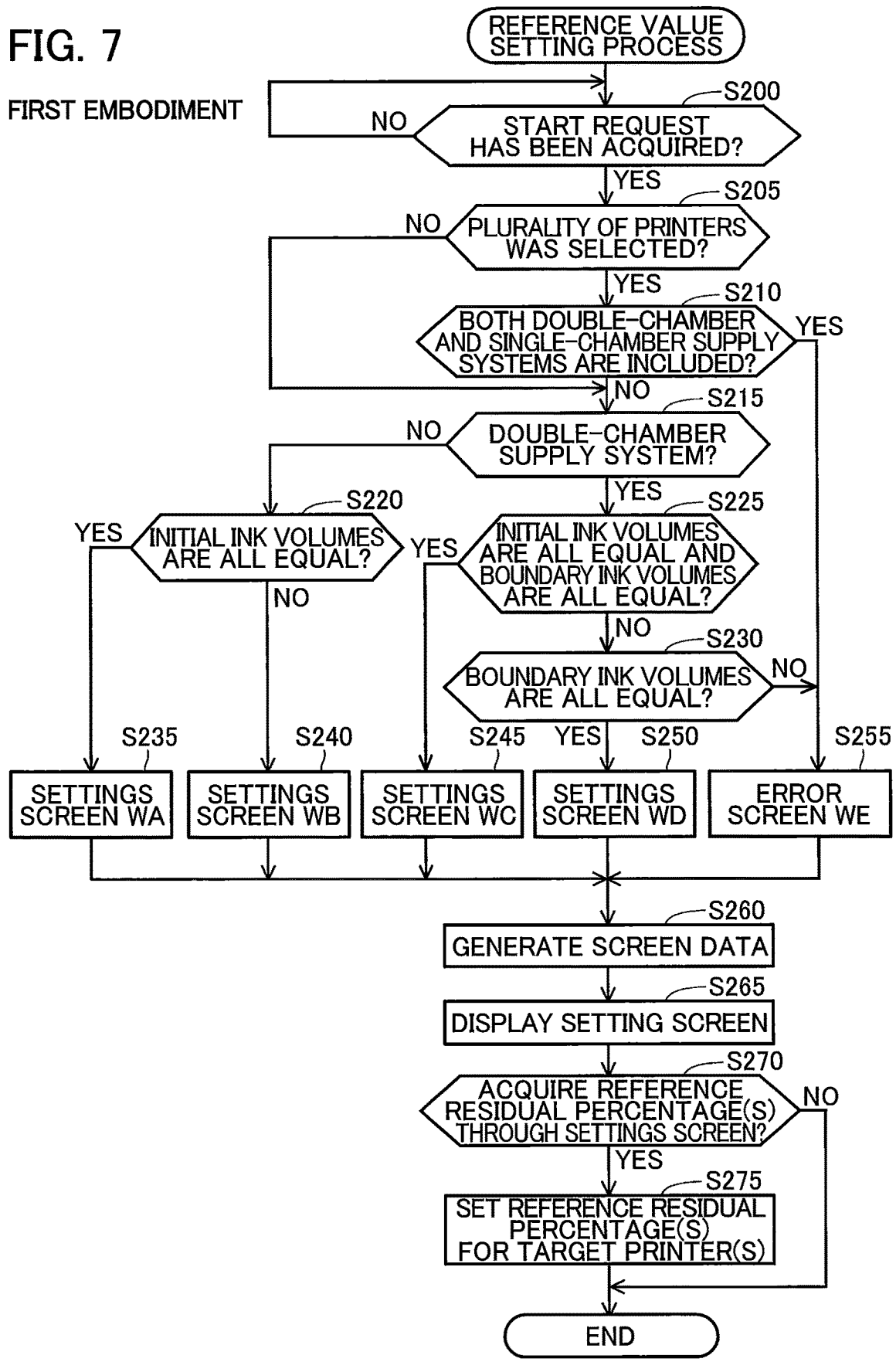
FIG. 7 FIRST EMBODIMENT

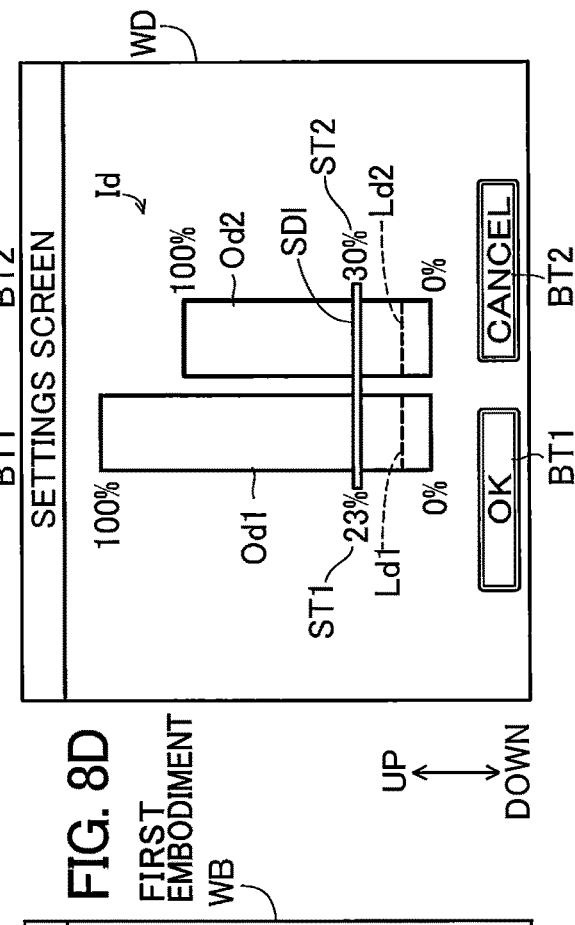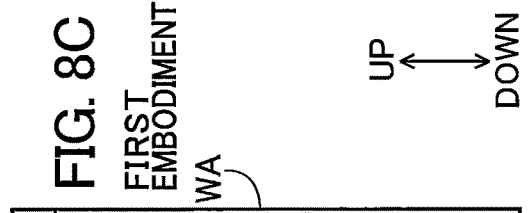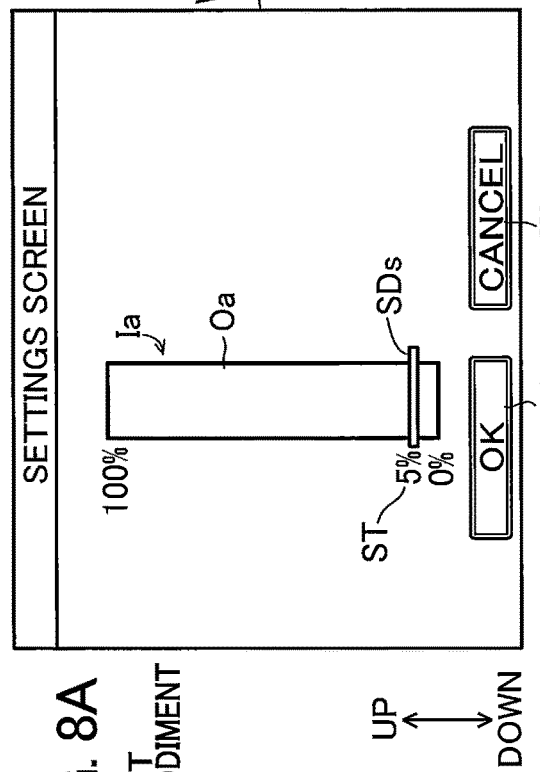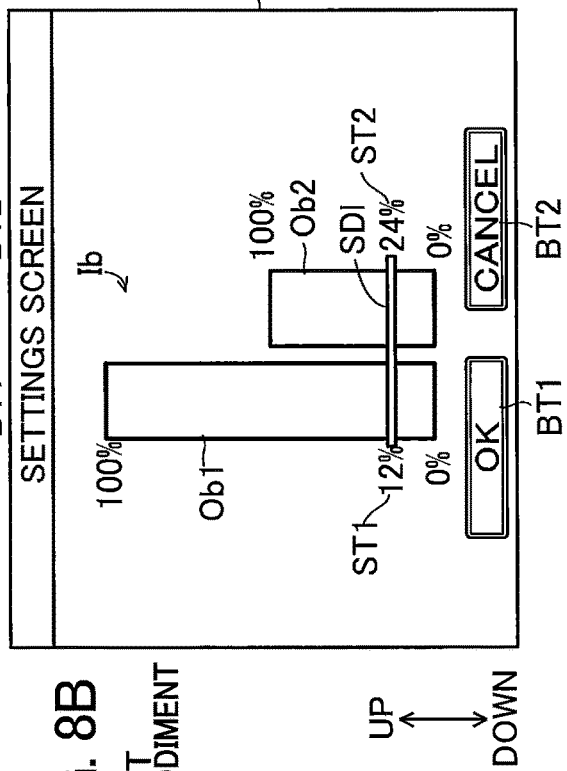

FIG. 11

SECOND EMBODIMENT

MANAGEMENT DATABASE PD2

| | SERIAL NUMBER | ACQUIRED STATUS | DETERMINED STATUS | REPLACEMENT COUNT | REPLACEMENT DAY | INK SUPPLY SYSTEM | INITIAL INK VOLUME IV | BOUNDARY INK VOLUME BV | BOUNDARY NUMBER OF PRINTING DAYS BD | RESIDUAL INK PERCENTAGE IR | REFERENCE NUMBER OF DAYS TD |
|---|---|---|---|---|---|---|---|---|---|---|---|
| EN1b | AAABBB | NORMAL | | 2 | 2017/1/21 | DOUBLE | 6000 | 200 | 2 DAYS | 40 | |
| EN2b | CCCDDD | NORMAL | LOW | 3 | 2017/3/24 | DOUBLE | 4000 | 200 | 2 DAYS | 25 | 3 DAYS |
| EN3b | GGGHHH | LOW | LOW | 3 | 2017/4/12 | SINGLE | 4000 | | | 5 | 2 DAYS |

. . .

SECOND EMBODIMENT

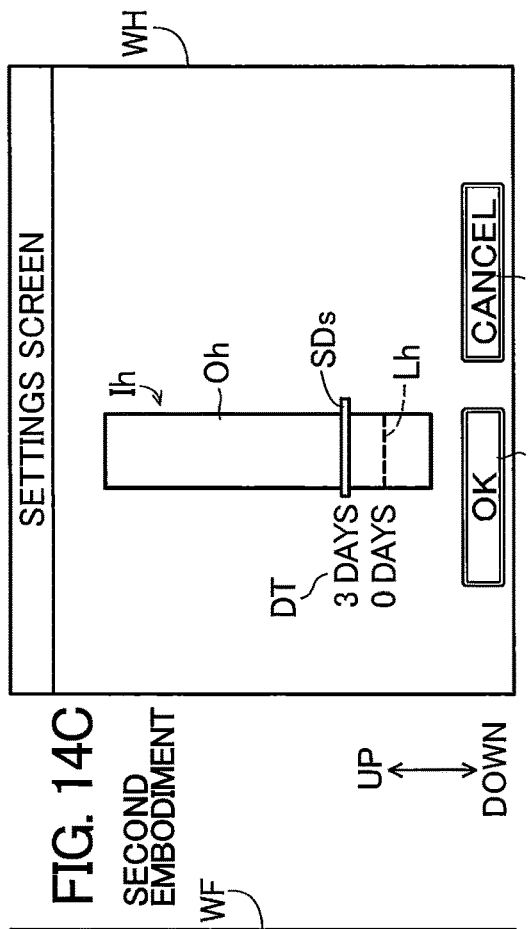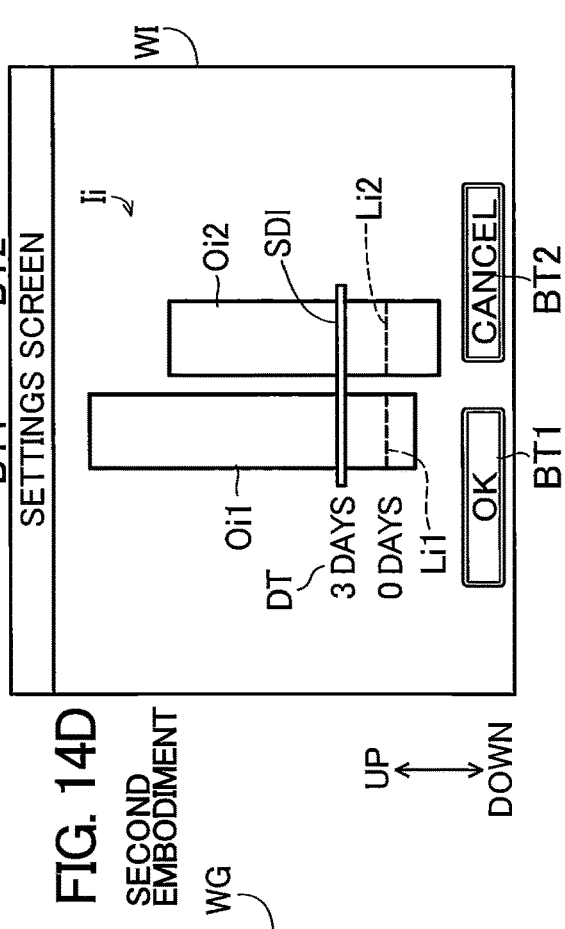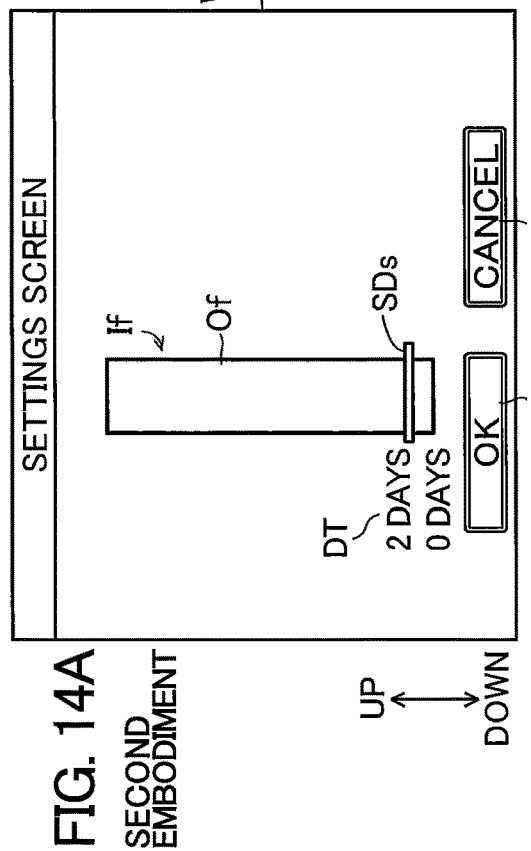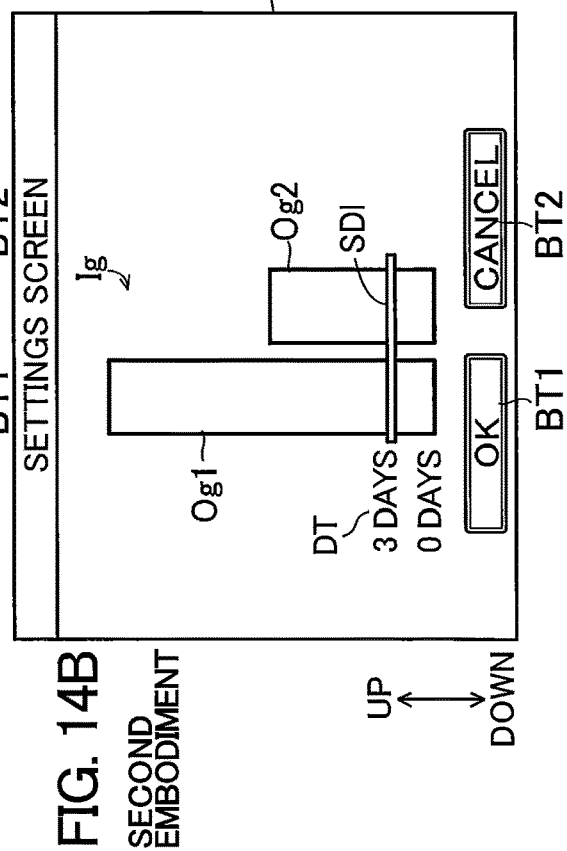

FIG. 15A VARIATION
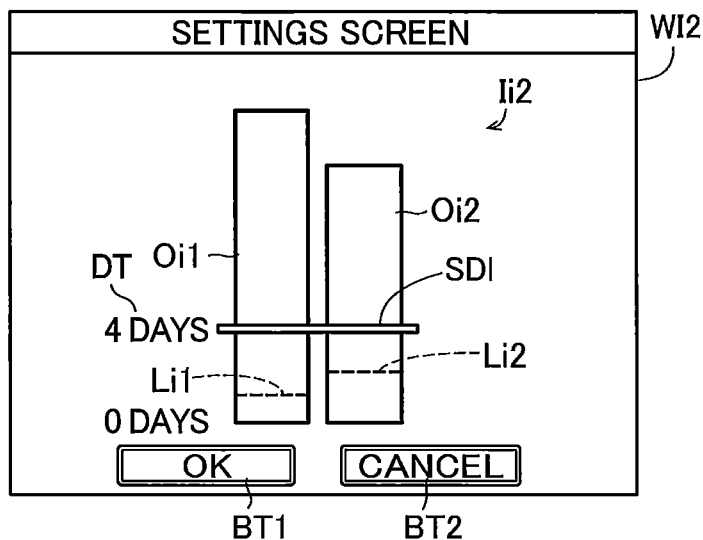
FIG. 15B VARIATION
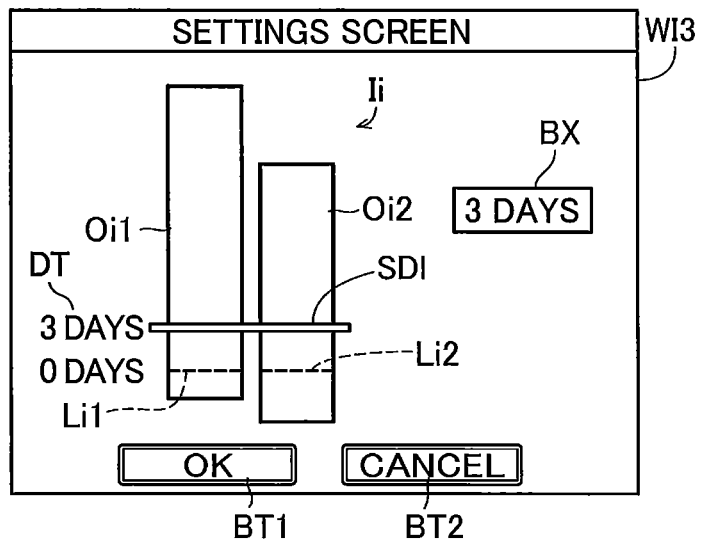
FIG. 15C VARIATION
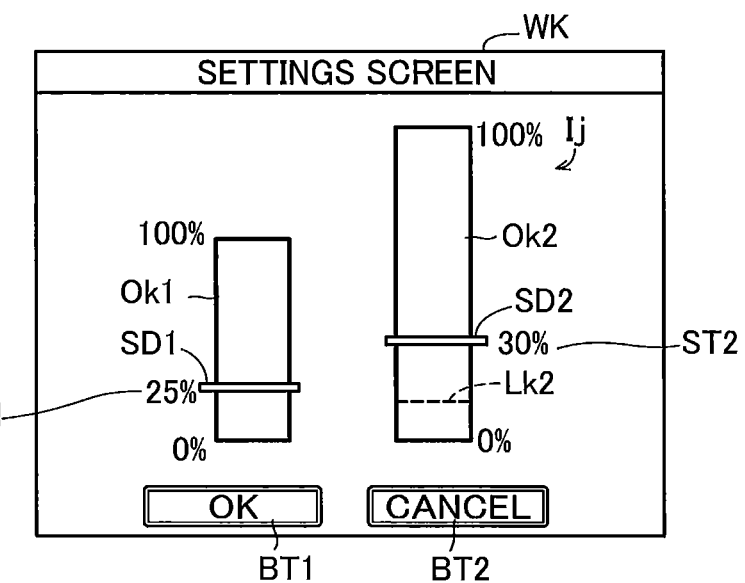

VARIATION

VARIATION

STORAGE MEDIUM STORING COMPUTER-READABLE INSTRUCTIONS FOR CAUSING INFORMATION-PROCESSING APPARATUS TO GENERATE AND OUTPUT SCREEN DATA REPRESENTING SCREEN RELATED TO SETTINGS OF REFERENCE VALUE

CROSS REFERENCE TO RELATED APPLICATION

This application claims priority from Japanese Patent Application No. 2018-065069 filed Mar. 29, 2018. The entire content of the priority application is incorporated herein by reference.

TECHNICAL FIELD

The present disclosure relates to an information-processing apparatus and a storage medium storing computer-readable instructions for the information-processing apparatus.

BACKGROUND

There has been known a conventional technique in which an image-forming device transmits an order request signal to a service center when the quantity of a developing agent in the image-forming device has fallen to a prescribed value or below.

SUMMARY

However, if the prescribed value in the conventional technology is not set properly, the image-forming device may not transmit the order request signal at a suitable timing, adding burden to the administrator (a user, for example) responsible for setting the prescribed value. Accordingly, there is need for a technique to simplify and facilitate the setting of a reference value (such as the prescribed value described in the conventional technology) used for determining whether a replenishment condition for replenishing a printing agent has been met.

In view of the foregoing, it is an object of the present disclosure is to provide a technique in which a reference value for determining whether a replenishment condition is met can be easily set.

In order to attain the above and other objects, according to one aspect, the present disclosure provides a non-transitory computer-readable storage medium storing a set of program instructions for an information-processing apparatus. The information-processing apparatus including: a processor; and a communication interface for communicating with a plurality of printing devices configured to perform printing operations using printing agent. The set of program instructions, when executed by the processor, causes the information-processing apparatus to perform: (a) acquiring, via the communication interface, a plurality of pieces of device information about respective ones of the plurality of printing devices; (b) determining whether two or more printing devices selected from among the plurality of printing devices by a user selection all have the same type on the basis of two or more of the plurality of pieces of device information corresponding to respective ones of the selected two or more of printing devices; (c) generating, on the basis of determination made in the (b) determining, screen data representing a screen regarding settings of two or more reference values for respective ones of the selected two or more printing devices, each of the two or more reference values being used to determine whether a replenishment condition for printing agent of the corresponding printing device is met, wherein, when the replenishment condition is met, a notification triggering replenishment of the corresponding printing device with printing agent is made; and (d) outputting the screen data generated in the (c) generating. In response to determination being made in the (b) determining that all of the selected two or more printing devices have the same type, the (c) generating generates first screen data as the screen data, the first screen data representing a first screen as the screen, the first screen being a settings screen through which a single common instruction is capable of being inputted, the single common instruction being a user instruction common to all of the two or more reference values, the two or more reference values being set on the basis of the inputted single common instruction. In response to determination being made in the (b) determining that not all of the selected two or more printing devices have the same type, the (c) generating generates second screen data as the screen data, the second screen data representing a second screen as the screen, the second screen being a screen through which the single common instruction is not capable of being inputted.

According to another aspect, the present disclosure provides an information-processing apparatus includes a communication interface and a controller. The communication interface is an interface for communicating with a plurality of printing devices configured to perform printing operations using printing agent. The controller is configured to perform: (a) acquiring, via the communication interface, a plurality of pieces of device information about respective ones of the plurality of printing devices; (b) determining whether two or more printing devices selected from among the plurality of printing devices by a user selection all have the same type on the basis of two or more of the plurality of pieces of device information corresponding to respective ones of the selected two or more of printing devices; (c) generating, on the basis of determination made in the (b) determining, screen data representing a screen regarding settings of two or more reference values for respective ones of the selected two or more printing devices, each of the two or more reference values being used to determine whether a replenishment condition for printing agent of the corresponding printing device is met, wherein, when the replenishment condition is met, a notification triggering replenishment of the corresponding printing device with printing agent is made; and (d) outputting the screen data generated in the (c) generating. In response to determination being made in the (b) determining that all of the selected two or more printing devices have the same type, the (c) generating generates first screen data as the screen data, the first screen data representing a first screen as the screen, the first screen being a settings screen through which a single common instruction is capable of being inputted, the single common instruction being a user instruction common to all of the two or more reference values, the two or more reference values being set on the basis of the inputted single common instruction. In response to determination being made in the (b) determining that not all of the selected two or more printing devices have the same type, the (c) generating generates second screen data as the screen data, the second screen data representing a second screen as the screen, the second screen being a screen through which the single common instruction is not capable of being inputted.

According to still another aspect, the present disclosure provides a method of generating and outputting screen data representing a screen about settings of printing devices. The method includes: (a) acquiring a plurality of pieces of device information about respective ones of the plurality of printing devices; (b) determining whether two or more printing devices selected from among the plurality of printing devices by a user selection all have the same type on the basis of two or more of the plurality of pieces of device information corresponding to respective ones of the selected two or more of printing devices; (c) generating, on the basis of determination made in the (b) determining, screen data representing a screen regarding settings of two or more reference values for respective ones of the selected two or more printing devices, each of the two or more reference values being used to determine whether a replenishment condition for printing agent of the corresponding printing device is met, wherein, when the replenishment condition is met, a notification triggering replenishment of the corresponding printing device with printing agent is made; and (d) outputting the screen data generated in the (c) generating. In response to determination being made in the (b) determining that all of the selected two or more printing devices have the same type, the (c) generating generates first screen data as the screen data, the first screen data representing a first screen as the screen, the first screen being a settings screen through which a single common instruction is capable of being inputted, the single common instruction being a user instruction common to all of the two or more reference values, the two or more reference values being set on the basis of the inputted single common instruction. In response to determination being made in the (b) determining that not all of the selected two or more printing devices have the same type, the (c) generating generates second screen data as the screen data, the second screen data representing a second screen as the screen, the second screen being a screen through which the single common instruction is not capable of being inputted.

BRIEF DESCRIPTION OF THE DRAWINGS

The particular features and advantages of the embodiment(s) as well as other objects will become apparent from the following description taken in connection with the accompanying drawings, in which:

FIG. 2A is a schematic diagram illustrating a structure of a print executing unit 170A, and particularly illustrating the print executing unit 170A in a first storage state;

FIG. 2B is a schematic diagram illustrating the structure of the print executing unit 170A, and particularly illustrating the print executing unit 170A in a second storage state;

FIG. 3A is a schematic diagram illustrating a structure of a print executing unit 170C;

FIG. 3B is a schematic diagram illustrating the structure of the print executing unit 170C, and particularly illustrating a state of stored ink when the level IS of ink Ik in an ink cartridge 200C has reached an empty level ELc;

FIG. 4 illustrates an example of a management database PD in the management server 300 according to the first embodiment;

FIG. 6 illustrates an example of a management list ML displayed by the management server 300 according to the first embodiment;

FIG. 7 is a flowchart illustrating steps in a reference value setting process performed by the management server 300 according to the first embodiment;

FIG. 8A illustrates an example of a settings screen WA displayed by the management server 300 according to the first embodiment;

FIG. 8B illustrates an example of a settings screen WB displayed by the management server 300 according to the first embodiment;

FIG. 8C illustrates an example of a settings screen WC displayed by the management server 300 according to the first embodiment;

FIG. 8D illustrates an example of a settings screen WD displayed by the management server 300 according to the first embodiment;

FIG. 11 illustrates an example of a management database PD2 in the management server according to the second embodiment;

FIG. 14A illustrates an example of a settings screen WF displayed by the management server according to the second embodiment;

FIG. 14B illustrates an example of a settings screen WG displayed by the management server according to the second embodiment;

FIG. 14C illustrates an example of a settings screen WH displayed by the management server according to the second embodiment;

FIG. 14D illustrates an example of a settings screen WI displayed by the management server according to the second embodiment;

FIG. 15A illustrates an example of a settings screen WI2 displayed by a management server according to one variation;

FIG. 15B illustrates an example of a settings screen WI3 displayed by a management server according to another variation;

FIG. 15C illustrates an example of a settings screen WK displayed by a management server according to still another variation;

DETAILED DESCRIPTION

A. First Embodiment

<A-1. Structure of a System 1000>

Figure 1:
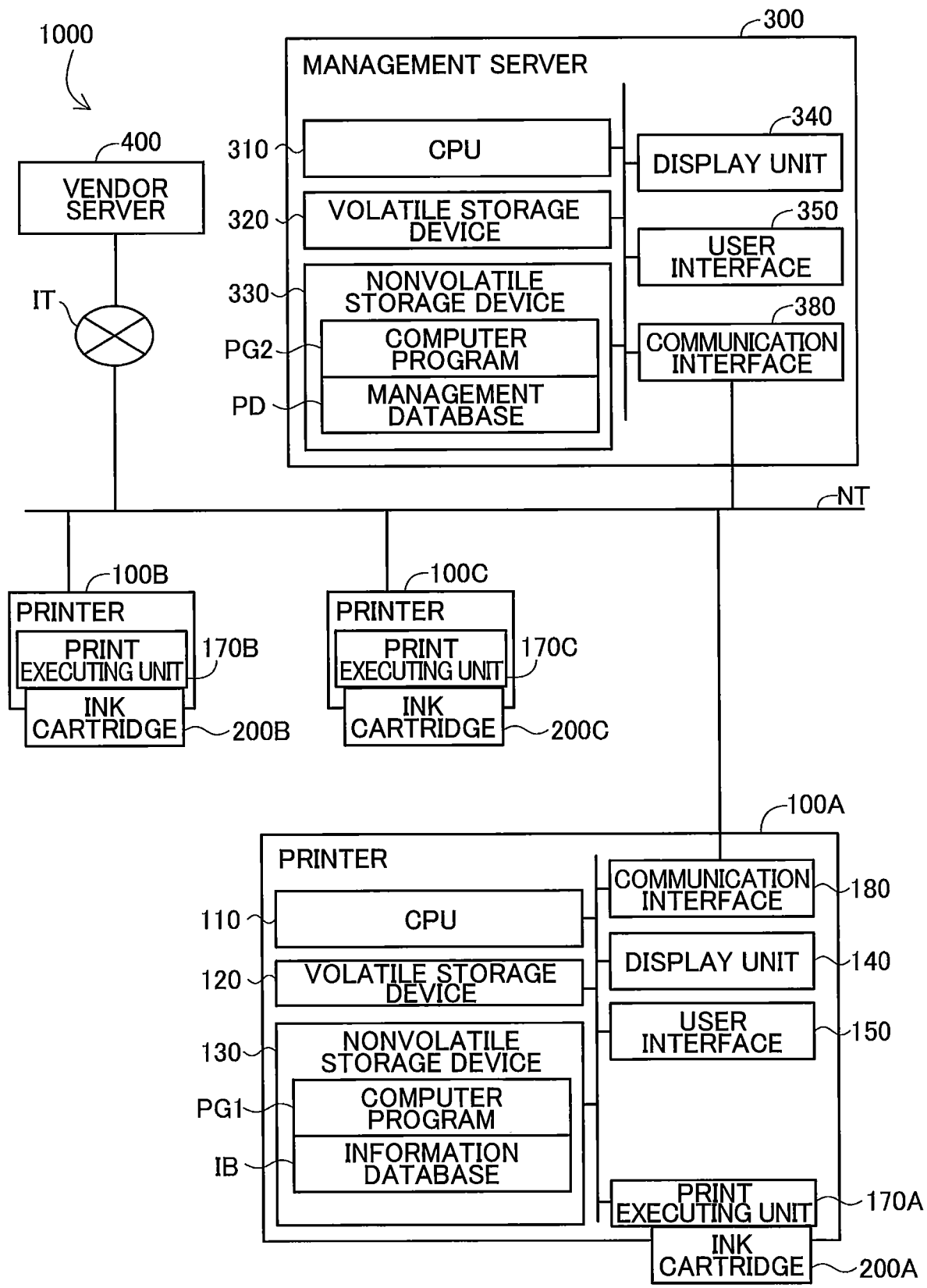
FIG. 1 is a block diagram illustrating a structure of a system 1000 including a management server 300 according to a first embodiment of the present disclosure.

FIG. 1 is a block diagram illustrating the structure of a system 1000. The system 1000 includes a plurality of printers including printers 100A, 100B, and 100C; a management server 300; and a vendor server 400. Note that, of the plurality of printers constituting the system 1000, the printers other than the printers 100A, 100B, and 100C are omitted in FIG. 1 to avoid complication of the drawing.

The management server 300 and the plurality of printers including the printers 100A, 100B, and 100C are connected to a local area network NT and can communicate with each other over the local area network NT. The vendor server 400 is a server belonging to the operator of the system 1000 and is connected to the Internet IT, for example. The vendor server 400 receives order notifications from the management server 300 in a management process described later. The management server 300 is an example of the claimed "information-processing apparatus".

The printer 100A includes a CPU 110 as a controller of the printer 100A; a volatile storage device 120, such as DRAM; a nonvolatile storage device 130, such as a hard disk drive or flash memory; a display unit 140, such as a liquid crystal display that displays images; a user interface 150, such as a touchscreen and buttons designed to acquire operations performed by the user; a print executing unit 170A; and a communication interface 180.

The communication interface 180 is an interface for connecting the printer 100A to the local area network NT. Specifically, the communication interface 180 is a wired interface conforming to Ethernet (registered trademark), or a wireless interface conforming to the Wi-Fi technology (based on the IEEE (Institute of Electrical and Electronics Engineers, Inc.) 802.11 standard or a standard based thereon, such as one of the versions 802.11a, 11b, 11g, and 11n).

The CPU 110 is a processor that performs data processing. The volatile storage device 120 provides a buffer region that temporarily stores various intermediate data generated when the CPU 110 performs processes. The nonvolatile storage device 130 stores a computer program PG1 for controlling the printer, and an information database D3 described later.

In the present embodiment, the computer program PG1 may be pre-stored in the nonvolatile storage device 130 when the printer 100A is manufactured. Alternatively, the computer program PG1 may be made available through download from a server connected to the printer 100A over the Internet IT, or may be provided in a recorded format, such as on a CD-ROM.

By executing the computer program PG1, the CPU 110 executes a printing process for controlling the print executing unit 170A to print images. Also, by executing the computer program PG1, the CPU 110 transmits various printer information related to the printer 100A that is stored in the information database D3 to the management server 300 in response to a request from the management server 300. The printer information is an example of the claimed "device information".

The print executing unit 170A executes printing operations in accordance with the control by the CPU 110. FIGS. 2A and 2B are schematic diagrams showing the structure of the print executing unit 170A. As shown in FIGS. 2A and 2B, the print executing unit 170A includes a printing mechanism 171A, an attachment portion 172A, an ink supply opening 174A, an intermediate container 175A, and an ink channel section 177A.

The printing mechanism 171A is an inkjet-type printing mechanism configured to print images on paper (a printing medium) using, as a printing agent, ink supplied from an ink cartridge 200A via the intermediate container 175A. In other words, the printing mechanism 171A is configured to perform printing operations using ink Ik (see FIG. 2A) stored in the intermediate container 175A. More specifically, the printing mechanism 171A forms images on paper by ejecting ink onto the paper from nozzles formed in a print head (not shown) to form dots on the paper. In the present embodiment, the printing mechanism 171A is a monochromatic printing mechanism using a single color of ink (black (K), for example).

Formed in the ink cartridge 200A are a main storage chamber 210A for accommodating ink Ik, an air hole 220A, and an ink outlet 230A. The air hole 220A is an opening providing communication between the main storage chamber 210A and the external air. The ink outlet 230A is an opening through which the ink Ik is supplied from the main storage chamber 210A to the print executing unit 170A via the intermediate container 175A. The ink outlet 230A is provided near the bottom (i.e., the lower end in the vertical direction) of the main storage chamber 210A so as to be capable of supplying all of the ink Ik in the main storage chamber 210A into the print executing unit 170A via the intermediate container 175A.

An integrated circuit (hereinafter called a "chip") 250A is mounted on the outer surface of the ink cartridge 200A. The chip 250A has memory storing various information about the ink cartridge 200A. The information stored in the memory of the chip 250A in the present embodiment includes information specifying an initial ink volume IV that is the quantity of ink Ik accommodated in a new ink cartridge 200A, and identification information (a serial number, for example) for identifying the ink cartridge 200A. The initial ink volume IV is an example of the claimed "initial quantity".

The attachment portion 172A is, for example, a holder to which the ink cartridge 200A is detachably attachable. The ink supply opening 174A communicates with the ink outlet 230A of the ink cartridge 200A attached to the attachment portion 172A. The ink Ik in the main storage chamber 210A is supplied into the print executing unit 170A through the ink supply opening 174A and the intermediate container 175A. The attachment portion 172A has a contact CP that contact an electrode on the chip 250A of the ink cartridge 200A when the ink cartridge 200A is attached to the attachment portion 172A. The printer 100A (the CPU 110) can read information stored in the memory of the chip 250A and write information to the memory through the contact CP.

An auxiliary storage chamber 179A for accommodating the ink Ik and an air hole 178A are formed in the intermediate container 175A. The intermediate container 175A receives the ink Ik from the ink cartridge 200A attached to the attachment portion 172A and stores the received ink Ik in the auxiliary storage chamber 179A.

The air hole 178A is an opening providing communication between the auxiliary storage chamber 179A and the external air. The auxiliary storage chamber 179A communicates with the ink supply opening 174A and stores ink supplied from the ink cartridge 200A through the ink supply opening 174A.

The upstream end of the ink channel section 177A is connected to the intermediate container 175A near the bottom surface of the auxiliary storage chamber 179A and is in communication with the auxiliary storage chamber 179A. The downstream end of the ink channel section 177A is connected to the print head (not shown) of the printing mechanism 171A. With this configuration, ink Ik in the auxiliary storage chamber 179A is supplied to the printing mechanism 171A through the ink channel section 177A. That is, the intermediate container 175A stores ink Ik received from the ink cartridge 200A attached to the attachment portion 172A and the printing mechanism 171A performs printing operations using the ink Ik stored in the intermediate container 175A.

As is clear from the above description, the intermediate container 175A is disposed along the path of ink Ik flowing from the ink cartridge 200A attached to the attachment portion 172A to the printing mechanism 171A.

This type of ink supply system that is provided with an intermediate container along the flow path of the ink Ik leading from the ink cartridge to the printing mechanism, as in the print executing unit 170A of the printer 100A, will be called a double-chamber supply system. The double-chamber supply system is an example of the claimed "specific supply system".

FIG. 2A depicts the print executing unit 170A in a first storage state S1, while FIG. 2B depicts the print executing unit 170A in a second storage state S2. In the first storage state S1, ink Ik remains both in the ink cartridge 200A (in the main storage chamber 210A) and in the intermediate container 175A (in the auxiliary storage chamber 179A). In the second storage state S2, ink Ik remains in the intermediate container 175A (the auxiliary storage chamber 179A), but no longer remains in the ink cartridge 200A (the main storage chamber 210A). In other words, in the second storage state S2, ink Ik vanishes from the ink cartridge 200A but remains in the intermediate container 175A. The first storage state S1 is an example of the claimed "first state". The second storage state S2 is an example of the claimed "second state".

The main storage chamber 210A in the ink cartridge 200A communicates with the atmosphere through the air hole 220A, and the auxiliary storage chamber 179A in the intermediate container 175A communicates with the atmosphere through the air hole 178A.

The auxiliary storage chamber 179A of the intermediate container 175A includes a section positioned lower (below in FIGS. 2A and 2B) than the bottom end of the main storage chamber 210A formed in the ink cartridge 200A, and a section positioned higher than the bottom end of the main storage chamber 210A. Thus, when a new ink cartridge 200A is attached to the attachment portion 172A, some of the ink Ik in the ink cartridge 200A transfers from the main storage chamber 210A into the auxiliary storage chamber 179A through the ink supply opening 174A. Consequently, the level ISm of ink Ik in the main storage chamber 210A and the level ISs of ink Ik in the auxiliary storage chamber 179A are adjusted to the same height (see FIG. 2A).

As ink Ik is consumed through printing by the printing mechanism 171A, the levels ISm and ISs drop while remaining at the same level as each other. Once the levels ISm and ISs reach a vertical position EL corresponding to the bottom of the main storage chamber 210A (hereinafter called an "empty level EL"), ink Ik no longer remains in the main storage chamber 210A. Hence, the state of the ink Ik shifts from the first storage state S1 in FIG. 2A to the second storage state S2 in FIG. 2B. Here, the state in which ink Ik no longer remains in the main storage chamber 210A of the ink cartridge 200A signifies that ink Ik no longer transfers from the main storage chamber 210A into the auxiliary storage chamber 179A and includes a state in which some ink Ik remains deposited on the inner walls of the main storage chamber 210A.

The printing mechanism 171A can continue to print even after the storage condition of ink Ik has shifted to the second storage state S2, provided that ink Ik remains in the auxiliary storage chamber 179A. If the ink cartridge 200A is replaced with a new ink cartridge after the storage condition has shifted to the second storage state S2, ink Ik will not be wasted since no ink Ik remains in the old ink cartridge 200A being replaced. Hence, the double-chamber supply system is advantageous in that the ink cartridge 200A can be replaced while printing is still possible, without wasting any ink Ik.

In the double-chamber supply system, a liquid level sensor (not shown) is provided in the intermediate container 175A for detecting whether the level ISs of ink Ik in the auxiliary storage chamber 179A has reached the empty level EL. With this arrangement, it can be detected whether ink Ik remains in the ink cartridge 200A.

The liquid level sensor may be configured with a float having a smaller specific density than that of the ink Ik. In this configuration, since the position of the float moves downward after the level ISs reaches the empty level EL, it can be detected by detecting movement of the float that the level ISs has reached the empty level EL. In other words, the liquid level sensor detects whether the storage condition of ink is the first storage state S1 or the second storage state S2. Other methods known in the art may be employed as the liquid level sensor, such as a method of measuring the electrical resistance of the ink Ik. The ink cartridge 200A need not be provided with a liquid level sensor when employing the double-chamber supply system. Accordingly, the double-chamber supply system is also advantageous in that the structure of the ink cartridge 200A can be simplified.

The ink volume corresponding to the boundary between the first storage state S1 and second storage state S2 will be called a boundary ink volume BV. In other words, the boundary ink volume BV is the total residual ink quantity at the time of transition from the first storage state S1 to the second storage state S2. The boundary ink volume BV in the present embodiment may be considered the quantity of ink in the auxiliary storage chamber 179A when the level ISs in the auxiliary storage chamber 179A has dropped to the empty level EL. The boundary ink volume BV may also be considered the maximum ink volume in the second storage state S2. Further, the boundary ink volume BV is equivalent to the capacity of the section of the auxiliary storage chamber 179A positioned below the bottom end of the main storage chamber 210A. The boundary ink volume BV is an example of the claimed "boundary quantity".

The information database IB stores printer information related to the printer 100A. Printer information includes information specifying the serial number and model name, for example. The model name is identification information for identifying the model type of the printer 100A and is also called "model number" or "model code". Printer information also includes ink information regarding the ink Ik, and history information about the printing history, for example. The ink information may include the initial ink volume IV for the ink cartridge 200A, the boundary ink volume BV, a replacement count indicating the number of times the ink cartridge 200A has been replaced, and a residual ink percentage IR. The history information is information related to the printing history, such as the number of pages printed within a prescribed period of time, and the total number of pages printed.

The printer 100A (the CPU 110) maintains the printer information in the information database D3 at the latest information by updating the history information and ink information stored in the information database IB each time a printing operation is executed, for example. The initial ink volume IV may be acquired from the memory on the chip 250A of the ink cartridge 200A, for example. The replacement count is incremented by one each time the identification information for the ink cartridge 200A acquired from the memory of the chip 250A differs from the identification information recorded in the information database IB, for example.

The printer 100B includes a print executing unit 170B (see FIG. 1) that differs from the print executing unit 170A of the printer 100A. The remaining structure of the printer 100B is identical to that of the printer 100A. As with the print executing unit 170A, the print executing unit 170B employs a double-chamber supply system that is provided with an intermediate container along the path of ink Ik flowing from the ink cartridge to the printing mechanism (not shown). However, the capacity of the intermediate container (auxiliary storage chamber) in the print executing unit 170B differs from the capacity of the intermediate container 175A in the print executing unit 170A and, hence, the boundary ink volume BV of the print executing unit 170B differs from that of the print executing unit 170A. Further, an ink cartridge 200B (see FIG. 1) attached to the print executing unit 170B has a different initial ink volume IV from the initial ink volume IV of the ink cartridge 200A.

The printer 100C includes a print executing unit 170C that differs from the print executing unit 170A of the printer 100A. The remaining structure of the printer 100C is identical to that of the printer 100A. Unlike the print executing unit 170A depicted in FIGS. 2A and 2B, the print executing unit 170C employs a single-chamber supply system that is not provide with an intermediate container along the path of the ink Ik flowing from an ink cartridge 200C to the printing mechanism.

FIGS. 3A and 3B are schematic diagrams showing the structure of the print executing unit 170C. The print executing unit 170C includes an inkjet-type printing mechanism 171C similar to the printing mechanism 171A, an attachment portion 172C, an ink supply opening 174C, and an ink channel section 177C.

As with the ink cartridge 200A, the ink cartridge 200C has a storage chamber 210C that accommodates ink Ik, an air hole 220C that provides communication between the storage chamber 210C and the external air, and an ink outlet 230C through which ink Ik is supplied to the print executing unit 170C. As with the ink cartridge 200A, a chip 250C is mounted on the outer surface of the ink cartridge 200C.

The attachment portion 172C is, for example, a holder to which the ink cartridge 200C is detachably attachable. The ink supply opening 174C communicates with the ink outlet 230C in the ink cartridge 200C attached to the attachment portion 172C. The upstream end of the ink channel section 177C communicates with the ink supply opening 174C, while the downstream end of the ink channel section 177C is connected to a print head (not shown) in the printing mechanism 171C. With this configuration, ink Ik in the ink cartridge 200C (the storage chamber 210C) is supplied to the printing mechanism 171C through the ink channel section 177C.

In the single-chamber supply system, a liquid level sensor (not shown) is provided in the ink cartridge 200C for detecting whether a level IS of ink Ik in the storage chamber 210C has reached an empty level ELc.

Since the single-chamber supply system does not include the intermediate container provided in the double-chamber supply system, the printing mechanism 171C becomes unable to print prior to the ink cartridge 200C running out of ink Ik. Specifically, the problem of air becoming mixed in with ink Ik supplied to the printing mechanism 171C may occur when the residual quantity of ink Ik in the ink cartridge 200C is slight. Therefore, printing with the printing mechanism 171C must be halted when the residual quantity of ink Ik in the ink cartridge 200C has lowered to a small quantity that may cause a mixture of air.

Therefore, in the single-chamber supply system, the empty level ELc (see FIGS. 3A and 3B) is set above the empty level EL (see FIGS. 2A, 2B, 3A, and 3B) in the ink cartridge 200A. FIG. 3B shows the state of stored ink when the level IS of ink Ik in the ink cartridge 200C has reached the empty level ELc. In this state, a small quantity of ink Ik remains in the ink cartridge 200C (the storage chamber 210C). When using the single-chamber supply system, the ink cartridge 200C is replaced after the level IS of ink Ik in the ink cartridge 200C has reached the empty level ELc.

Of the plurality of printers provided in the system 100, the printers 100A, 100B, and 100C have been described. Although the system 1000 is provided with other printers, a description of the other printers has been omitted, but the other printers each employ one of a single-chamber supply system and double-chamber supply system. The plurality of printers provided in the system 1000 may include two or more printers employing a double-chamber supply system that all have the same boundary volume BV but differing initial ink volumes IV. The plurality of printers provided in the system 1000 may include two or more printers employing a double-chamber supply system that all have the same boundary volume BV and initial ink volume IV. The plurality of printers provided in the system 1000 may include two or more printers employing a double-chamber supply system (the printers 100A and 100B, for example) that have differing boundary volumes BV and initial ink volumes IV. The plurality of printers provided in the system 1000 may include two or more printers employing a single-chamber supply system that have the same initial ink volume IV. The printers provided in the system 1000 may include two or more printers employing a single-chamber supply system that have differing initial ink volumes IV.

The management server 300 is a computer owned by the administrator of the plurality of printers provided in the system 1000. The management server 300 is provided with a CPU 310 serving as a controller of the management server 300; a volatile storage device 320, such as DRAM; a nonvolatile storage device 330, such as a hard disk drive or flash memory; a display unit 340, such as a liquid crystal display that displays images; a user interface 350, such as a keyboard and mouse; and a communication interface 380. The management server 300 is an example of the claimed "information-processing apparatus."

The communication interface 380 is connected to the local area network NT. As with the communication interface 180 of the printer 100A, the communication interface 380 is a wired interface conforming with Ethernet (registered trademark), or a wireless interface conforming with Wi-Fi technology or a standard based on this technology.

The CPU 310 is a processor that performs data processes. The volatile storage device 320 provides a buffer region for temporarily storing various intermediate data generated when the CPU 310 performs processes. The nonvolatile storage device 330 stores a computer program PG2, and a management database PD. The CPU 310 is an example of the claimed "controller."

The computer program PG2 is an application program provided in a downloadable format from the vendor server 400, for example. Here, the vendor server 400 is a server provided by the company that manages the system 1000 or the vendor that manufactures the plurality of printers provided in the system 1000. Alternatively, the computer program PG2 may be provided in a recorded format, such as on a CD-ROM, or may be pre-stored in the nonvolatile storage device 330 when the management server 300 is manufactured.

By executing the computer program PG2, the management server 300 (the CPU 310) executes processes (described later) related to management of the plurality of printers (including printers 100A, 100B, and 100C) in the system 1000, such as a management process, a printer information display process, and a reference value setting process.

The management database PD records device information (for example, printer information) collected by the management server 300. FIG. 4 shows an example of the management database PD according to the first embodiment. As shown in FIG. 4, the management database PD includes a plurality of entries corresponding to respective ones of the plurality of printers under management. In FIG. 4, only entries EN1, EN2, and EN3 corresponding to the printers 100A, 100B, and 100C, respectively, are illustrated as representative examples.

Entry EN1 that corresponds to the printer 100A includes a plurality of printer information items for the printer 100A, and specifically a serial number, model name, IP address, and ink-related information about the ink Ik. The ink-related information includes information on an acquired status, a determined status, a replacement count, the ink Ik supply system described above, the initial ink volume IV, the boundary ink volume BV, the residual ink percentage IR, and a reference residual percentage TR.

The serial number is identification information used to identify the printer 100A. The model name specifies the device model of the printer 100A. The IP address is an address that has been assigned to the printer 100A.

The acquired status and the determined status are information specifying the state of residual ink Ik in the ink cartridge 200A currently attached to the attachment portion 172A. Each of the acquired status and the determined status takes one of the values "normal" and "low".

The acquired status is information acquired from the printer 100A specifying determination results that the printer 100A found using the liquid level sensor described above. Specifically, the acquired status is "normal" when the level ISs is determined to be higher than the empty level EL based on the liquid level sensor, and "low" when the level ISs is determined to be at or below the empty level EL.

The determined status specifies determination results found based on the residual ink percentage IR and reference residual percentage TR in the management process described later. That is, the determined status is "normal" when the residual ink percentage IR is greater than the reference residual percentage TR, and "low" when the residual ink percentage IR is less than or equal to the reference residual percentage TR. When not yet determined, the determined status is not included in the entry EN1.

The replacement count indicates the number of times that the ink cartridge 200A has been replaced in the printer 100A from the beginning of operations in the system 1000 to the present. The supply system indicates one of the single-chamber supply system and double-chamber supply system. Incidentally, the supply system for the printer 100A is the double-chamber supply system.

The residual ink percentage IR is an index value denoting a total residual ink quantity. The total residual ink quantity is the total quantity of a quantity of ink Ik remaining in the ink cartridge 200A and a quantity of ink Ik remaining in the intermediate container 175A. The residual ink percentage IR is an example of the claimed "index value". The total residual ink quantity is an example of the claimed "total residual quantity." The quantity of ink Ik remaining in the ink cartridge 200A is an example of the claimed "first residual quantity." The quantity of ink Ik remaining in the intermediate container 175A is an example of the claimed "second residual quantity."

In the present embodiment, the residual ink percentage IR is the ratio of the current total residual ink quantity to the initial ink volume IV of the ink cartridge 200A (in units of % in the present embodiment). Thus, the entire range of possible values for the residual ink percentage IR ranges from 0% to a percentage greater than 100%. The residual ink percentage IR can be called an index value of residual ink quantity. Each time a printing operation is executed on the printer 100A, the printer 100A calculates the residual ink percentage IR using: the consumed quantity of ink Ik calculated on the basis of the print data and the number of printed pages; and the residual ink percentage IR prior to executing the printing operation.

The reference residual percentage TR is used by the management server 300 for determining the determined status described above. The reference residual percentage TR is a threshold value for the residual ink percentage IR described above. When not yet set, the reference residual percentage TR is not included in the entry EN1. The reference residual percentage TR is an example of the claimed "reference value".

Entries EN2 and EN3 for the printers 100B and 100C, respectively, include information for the same items that are included in the entry EN1 for the printer 100A. However, the printer 100C employs the single-chamber supply system and is not provided with an intermediate container. Thus, the entry EN3 does not include a boundary ink volume BV.

Of the printer information recorded in the management database PD in the present embodiment, the serial number, model name, and IP address for each printer are acquired by the management server 300 when operations of the system 1000 are initiated, for example. In the present embodiment, Simple Network Management Protocol (SNMP) is used for acquiring this information.

Specifically, the management server 300 broadcasts an SNMP request over the local area network NT to search for printers on the local area network NT. The printers 100A, 100B, and 100C issue responses to the SNMP request that include their own IP address. The management server 300 then uses each IP address received in response to the SNMP request to transmit, to each of the printers 100A, 100B, and 100C, an individual SNMP request requesting the transmission of their serial number and model name. Then, the management server 300 receives the serial number and model name for each of the printers 100A, 100B, and 100C in response to these SNMP requests. The management server 300 then records the received serial number, model name, and IP address in the management database PD, thereby registering the printers 100A, 100B, and 100C as printers under management.

Of the printer information recorded in the management database PD, the acquired status, replacement count, ink Ik supply system, initial ink volume IV, boundary ink volume BV, and residual ink percentage IR are acquired in the management process described later from the printers 100A, 100B, and 100C that are under management. The determined status is determined in the management process, and the reference residual percentage TR is set in the reference value setting process (described later in detail).

<A-2. Operations of the System 1000>
<A-2-1. Management Process>

The management server 300 (the CPU 310) executes the management process for managing printers that are under management. In the present embodiment, the printers under management are the plurality of printers (including the printers 100A, 100B, and 100C) provided in the system 1000. The management server 300 executes this management process periodically, such as at predetermined times with a frequency of one to multiple times per day. The management process is executed for each of the plurality of printers (including the printers 100A, 100B, and 100C) under management. In the following description, a case where the printer 100A is a target printer for which the management process is executed will be described as an example.

Figure 5:
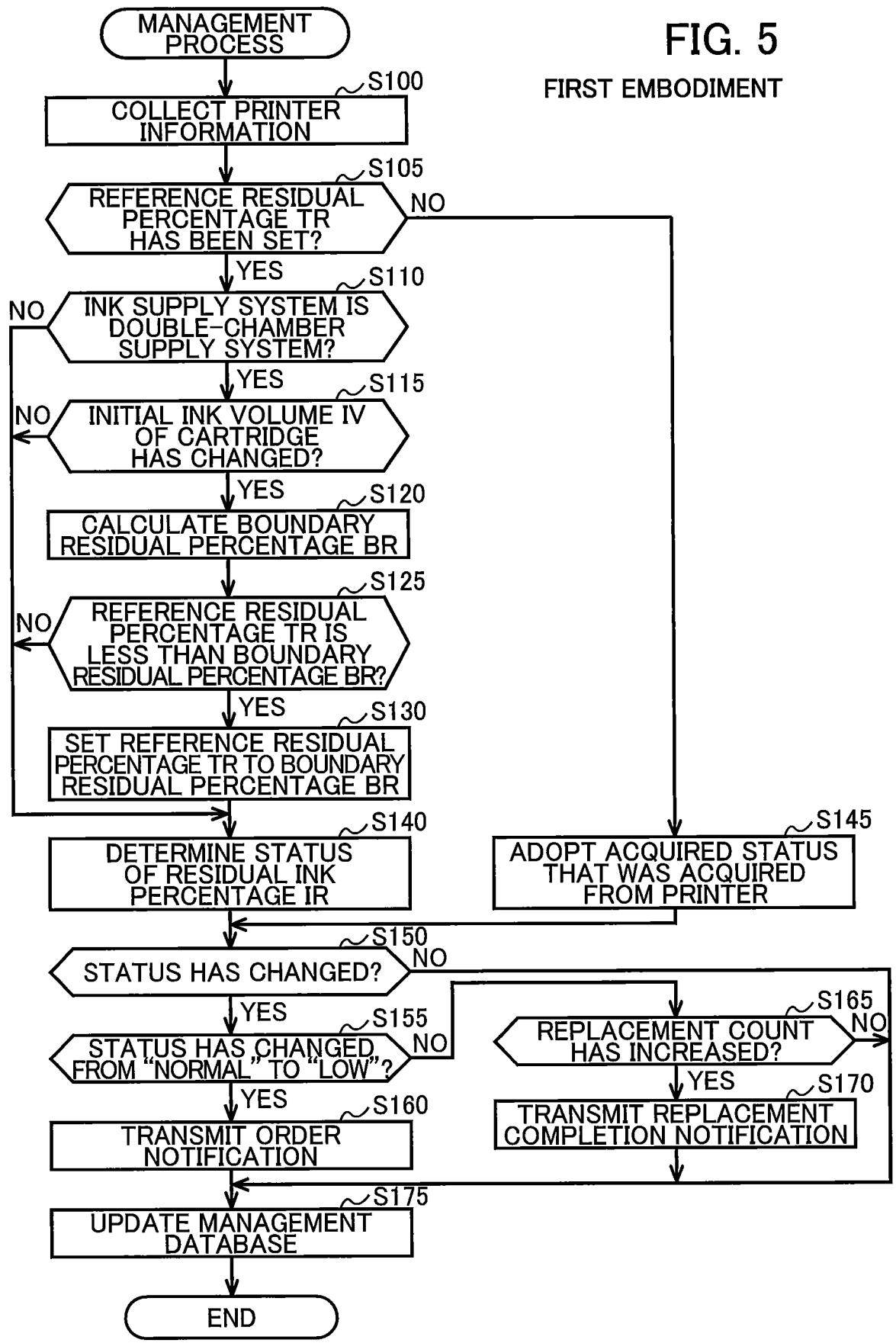
FIG. 5 is a flowchart illustrating steps in the management process performed by the management server 300 according to the first embodiment.

FIG. 5 is a flowchart illustrating steps in the management process. In S100 of FIG. 5, the management server 300 collects printer information from the printer 100A that is the processing target printer in this example. In the present embodiment, the management server 300 collects printer information using SNMP. Specifically, the management server 300 transmits, to the printer 100A, a SNMP request requesting information items to be collected from the printer information. The management server 300 subsequently receives this printer information from the printer 100A in response to the SNMP request.

The management server 300 records the printer information collected from the printer 100A in the volatile storage device 120. Printer information already recorded in the management database PD is not updated at this time because it will be necessary to reference the previously acquired printer information in a subsequent step. The collected printer information includes the acquired status, replacement count, ink Ik supply system, initial ink volume IV, boundary ink volume BV, and residual ink percentage IR described above.

In S105 the management server 300 determines whether a reference residual percentage TR has been set for the printer 100A. When a reference residual percentage TR has been recorded in the management database PD, the management server 300 determines that a reference residual percentage TR has been set. The management server 300 advances to S110 when a reference residual percentage TR has been set (S105: YES) and advances to S145 when a reference residual percentage TR has not been set (S105: NO).

In S110 the management server 300 determines, on the basis of the ink Ik supply system included in the collected printer information, whether the ink Ik supply system of the processing target printer is the double-chamber supply system. When the ink Ik supply system is the double-chamber supply system (S110: YES), the management server 300 advances to S115. However, if the ink Ik supply system is not the double-chamber supply system, i.e., when the ink Ik supply system is the single-chamber supply system (S110: NO), the management server 300 skips steps S115 through S130 and advances to S140. Since the processing target printer is the printer 100A in this description, in this step the management server 300 determines that the supply system is the double-chamber supply system. When the processing target printer is the printer 100C, the management server 300 will determine that the supply system is not the double-chamber supply system.

In S115 the management server 300 determines whether the initial ink volume IV has changed since the last time the management process was executed. The initial ink volume IV could change because multiple types of ink cartridges 200A having different initial ink volumes IV can be attached to the printer 100A, for example. For example, the initial ink volume IV of an ink cartridge 200A whose main storage chamber 210A has a relatively small capacity differs from the initial ink volume IV of an ink cartridge 200A whose main storage chamber 210A has a relatively large capacity. Consequently, the initial ink volume IV could be different from the last time the management process was executed if the ink cartridge 200A were replaced sometime between the last execution of the management process and the present time.

When the initial ink volume IV specified in the printer information acquired in S100 is different from the initial ink volume IV recorded in the management database PD, the management server 300 determines that the initial ink volume IV has been changed. The management server 300 advances to S120 when the initial ink volume IV has been changed (S115: YES). On the other hand, the management server 300 skips S120 through S130 and advances to S140 when the initial ink volume IV has not changed (S115: NO).

In S120 the management server 300 calculates a boundary index value. The boundary index value is an index value related to the boundary ink volume BV. As indicated in step S220 of the reference value setting process described later with reference to FIG. 7, the management server 300 uses a boundary residual percentage BR as the boundary index value in the first embodiment.

The boundary residual percentage BR is the ratio (in units of % in the present embodiment) of the boundary ink volume BV to the initial ink volume IV (BR=(BV/IV)×100). The boundary residual percentage BR can be thought of as the residual ink percentage IR corresponding to the boundary ink volume BV. That is, the boundary residual percentage BR corresponds to the boundary ink volume BV. For example, if the initial ink volume IV changes from a first value IV1 to a second value IV2 that is smaller than the first value IV1 due to the ink cartridge 200A being replaced, the boundary residual percentage BR will become a larger value than before the replacement of the ink cartridge 200A. The boundary residual percentage BR is an example of the claimed "boundary index value".

In S125 the management server 300 determines whether the reference residual percentage TR recorded in the management database PD is less than the boundary residual percentage BR calculated in S120. As will be described later, the reference residual percentage TR is set to a value greater than or equal to the boundary residual percentage BR at the time of setting the reference residual percentage TR. However, if the ink cartridge 200A is replaced, the boundary residual percentage BR could change to a value larger than the value prior to the replacement, causing the already set reference residual percentage TR to become less than the boundary residual percentage BR after the replacement.

When the reference residual percentage TR is less than the boundary residual percentage BR (S120: YES), the management server 300 advances to S130. In S130 the management server 300 resets the reference residual percentage TR to the boundary residual percentage BR. As will be described later, this step is performed because the reference residual percentage TR is prohibited from being set to a value less than the boundary residual percentage BR in the present embodiment.

On the other hand, when the reference residual percentage TR is greater than or equal to the boundary residual percentage BR (S120: NO), the management server 300 skips S130 and advances to S140.

In S140 the management server 300 determines the status of the residual ink percentage IR by comparing the residual ink percentage IR with the reference residual percentage TR. Specifically, the management server 300 determines that the status of the residual ink percentage IR is "normal" when the residual ink percentage IR is greater than the reference residual percentage TR (IR>TR) and determines that the status is "low" when the residual ink percentage IR is less than or equal to the reference residual percentage TR (IR TR).

When the management server 300 determines in S105 that a reference residual percentage TR has not been set (S105: NO), in S145 the management server 300 adopts, as the status of the residual ink percentage IR, the acquired status that is acquired from the printer 100A in S100.

In S150 the management server 300 determines whether the current status of the residual ink percentage IR has changed from the status in the previous management process. When a determined status is recorded in the management database PD, the management server 300 adopts this determined status as the status of the residual ink percentage IR in the previous management process. However, if a determined status is not recorded in the management database PD, the management server 300 adopts, as the status of the residual ink percentage IR in the previous management process, the acquired status recorded in the management database PD.

When the status of the residual ink percentage IR has changed (S150: YES), the management server 300 advances to S155. On the other hand, when the status has not changed (S150: NO), the management server 300 advances to S175.

In S155 the management server 300 determines whether the status of the residual ink percentage IR has changed from "normal" to "low." The management server 300 advances to S160 when the status of the residual ink percentage IR has changed from "normal" to "low" (S155: YES). However, the management server 300 advances to S165 when the status has not changed from "normal" to "low," i.e., when the status has changed from "low" to "normal" (S155: NO).

In S160 the CPU 110 transmits an order notification for an ink cartridge 200A to the vendor server 400. The order notification may be an email addressed to a preregistered email address for the vendor server 400. The order notification includes information indicating that this notification is a notification about an order of an ink cartridge 200A, information identifying the ink cartridge 200A being ordered (the part number, for example), and information identifying the printer 100A (the serial number, for example). The order notification can be considered a notification triggering replenishment of the printer 100A (the print executing unit 170A) with ink Ik.

When the vendor server 400 receives the order notification, the vendor of the vendor server 400 makes arrangements to ship a new ink cartridge 200A. The new ink cartridge 200A is shipped to a preregistered address for the user of the printers 100A, 100B, and 100C. When the new ink cartridge 200A arrives at this location, the user of the printer 100A replaces the old ink cartridge 200A in the printer 100A with the new ink cartridge 200A.

In S165 the management server 300 determines whether the replacement count for the ink cartridge 200A has increased from the replacement count for the ink cartridge 200A in the previous management process. The management server 300 determines that this replacement count has increased when the replacement count acquired in S100 is greater than the replacement count recorded in the management database PD.

When the replacement count has increased (S165: YES), it is considered that the status of the residual ink percentage IR changed from "low" to "normal" due to the ink cartridge 200A being replaced in the printer 100A. Accordingly, in S170 the management server 300 transmits, to the vendor server 400, a replacement completion notification indicating that replacement of the ink cartridge 200A was completed. As with the order notification, this replacement completion notification is an email addressed to the vendor server 400. The replacement completion notification may include information indicating this notification is a notification notifying that the ink cartridge 200A was replaced, and information identifying the printer 100A, for example. When the vendor server 400 receives this replacement completion notification, the vendor can recognize that the ink cartridge 200A was replaced on the printer 100A.

However, if the replacement count has not increased (S165: NO), then it is considered that the change in the status of the residual ink percentage IR from "low" to "normal" is due to an error in the status of the residual ink percentage IR acquired in the current management process. For example, when the acquired status acquired from the printer 100A is adopted as the status of the residual ink percentage IR (S145), it is possible that an incorrect acquired status was acquired due to a malfunction of the liquid level sensor in the printer 100A. In this case, the management server 300 skips S170 and advances to S175.

In S175 the management server 300 updates the management database PD. Here, the printer information collected from the printer 100A and stored in the volatile storage device 120 in S100 is recorded in the entry EN1 associated with the printer 100A in the management database PD. However, when it is determined in S165 that the replacement count has not increased, it is considered that the acquired status is incorrect. Accordingly, the management server 300 updates the printer information, excluding the acquired status (i.e., the acquired status is not updated). Further, when the management server 300 determines the status of the residual ink percentage IR in S140, in S175 the management server 300 records this status determined in S140 in the management database PD as the determined status.

In the management process described above, if a reference residual percentage TR has been set for the processing target printer, the condition for transmitting an order notification is that the state of the residual ink percentage IR has changed from a state of being greater than the reference residual percentage TR (i.e., a state in which the status is determined to be "normal") to a state of being less than or equal to the reference residual percentage TR (i.e., a state in which the status is determined to be "low").

Further, the condition for transmitting an order notification can be considered a condition for determining that replenishment of ink Ik is necessary. Accordingly, the condition for transmitting an order notification will be called a "replenishment condition." When a reference residual percentage TR has not been set for the processing target printer, the replenishment condition is that the acquired status determined on the basis of the liquid level sensor in the processing target printer changes from "normal" to "low".

<A-2-3. Printer Information Display Process>

Separate from the management process described above, the management server 300 executes a printer information display process to display a management list ML on the display unit 340 when a request to display the list is acquired from the user via the user interface 350. The user of the management server 300 is the administrator of the system 1000, for example. The administrator of the system 1000 may be a user of the plurality of printers (including printers 100A, 100B, and 100C) under management or may be someone other than a user of the plurality of printers, such as the vendor of the plurality of printers.

FIG. 6 illustrates an example of the management list ML. The management list ML is generated on the basis of the management database PD and is a list of printer information for the plurality of printers under management. In this example, the management list ML includes a plurality of lines corresponding to respective ones of the plurality of printers under management. In FIG. 6, only three lines L1, L2, and L3 corresponding, respectively, to the three printers 100A, 100B, and 100C under management are illustrated as representative examples. The lines L1, L2, and L3 include some of the printer information included in the corresponding entries EN1, EN2, and EN3 in the management database PD. Displaying the management list ML allows the user to easily confirm printer information for the printers 100A, 100B, and 100C under management.

The user manipulates a cursor CS to select one or more of the lines L1, L2, and L3 corresponding to one or more desired target printer and performs a prescribed operation on the line (a right mouse click, for example) to display a sub-window SW on the display unit 340. In this way, the user can select two or more lines corresponding to respective ones of two or more printers. Accordingly, the user can select two or more printers as processing target printers. Selection of two or more printers performed by the user through the sub-window SW is an example of the claimed "user selection".

In the example of FIG. 6, since the lines L2 and L3 corresponding, respectively, to the printer 100B and the printer 100C has been selected, the two printers 100B and 100C are processing target printers. The sub-window SW displays a list of processes that can be performed. Possible processes in the example of FIG. 6 include a deleting process to delete the printer information, an updating process to update the printer information, and a reference value setting process.

When the user operates the cursor CS to select the reference value setting process in the sub-window SW and performs a prescribed operation on the selected process (a left mouse click, for example), the management server 300 acquires a request to initiate the reference value setting process for the target printer. In this way, the user can select one or more of the plurality of printers under management in the system 1000 as the target printers for the reference value setting process.

<A-2-4. Reference Value Setting Process>

FIG. 7 is a flowchart illustrating steps in the reference value setting process. The reference value setting process is a process for setting a reference value used in the management process described above for the target printer. In the first embodiment, the reference value is the reference residual percentage TR.

In S200 the management server 300 (the CPU 310) determines whether the request described above to initiate the reference value setting process has been acquired. If the start request has been acquired (S200: YES), the management server 300 advances to S205. However, while a start request has not been acquired (S200: NO), the management server 300 waits until a start request is acquired.

In S205 the management server 300 determines whether a plurality of printers was selected as target printers. When a plurality of printers was not selected as target printers, i.e., when only one printer was selected (S205: NO), the management server 300 skips S210 and advances to S215. In S215 the management server 300 determines whether the ink supply system of the target printer is the double-chamber supply system. When the ink supply system of the target printer is not the double-chamber supply system, the management server 300 skips S220 and advances to S235. On the other hand, when the ink supply system of the target printer is the double-chamber supply system, the management server 300 skips S225 and advances to S245.

When a plurality of printers was selected (S205: YES), in S210 the management server 300 determines whether the ink supply systems of the target printers include both double-chamber and single-chamber supply systems.

When the ink supply systems of the target printers include both double-chamber and single-chamber supply systems (S210: YES), the management server 300 advances to S255. However, if the ink supply systems of the printers are only double-chamber supply systems or only single-chamber supply systems (S210: NO), the management server 300 advances to S215. Note that information specifying the supply system of each target printer is included in the printer information recorded in the management database PD (see FIG. 4).

In S215 the management server 300 determines whether the ink supply system of the target printers is the double-chamber supply system. When the target printers do not employ the double-chamber supply system, i.e., when the printers employ the single-chamber supply system (S215: NO), in S220 the management server 300 determines whether the initial ink volumes IV of the target printers are all equal.

When the initial ink volumes IV are all equal (S220: YES), in S235 the management server 300 sets a settings screen to be displayed to a settings screen WA. However, when the initial ink volumes IV for the target printers include two or more different values (S220: NO), in S240 the management server 300 sets the settings screen to be displayed to a settings screen WB. Note that the initial ink volumes IV for target printers are included in the printer information recorded in the management database PD (see FIG. 4). The settings screens WA and WB will be described later.

When the management server 300 determines in S215 that the target printers all employ the double-chamber supply system (S215: YES), in S225 the management server 300 determines whether the target printers all have the same initial ink volumes IV and all have the same boundary volumes BV. When the target printers all have the same initial ink volumes IV and boundary volumes BV (S225: YES), in S245 the management server 300 sets the settings screen to be displayed to a settings screen WC (described later).

However, when the initial ink volumes IV of the target printers include two or more different values or when the boundary volumes BV of the target printers include two or more different values (S225: NO), in S230 the management server 300 determines whether the target printers all have the same boundary volumes BV. When the boundary volumes BV for the target printers are all the same (S230: YES), in S250 the management server 300 sets the settings screen to be displayed to a settings screen WD (described later).

On the other hand, when the boundary volumes BV of the target printers include two or more different values (S230: NO), in S255 the management server 300 sets the settings screen to be displayed to an error screen WE (described later). Note that the boundary volumes BV for the target printers are included in the printer information recorded in the management database PD (see FIG. 4).

After setting the screen to be displayed, in S260 the management server 300 generates screen data representing the screen to be displayed (one of the screens WA-WE described above). In S265 the management server 300 displays a screen on the display unit 340 based on the screen data generated in S260. Each of the settings screens WA-WD in the first embodiment is an example of the claimed "first screen". The error screen WE in the first embodiment is an example of the claimed "second screen". The screen data representing one of the settings screens WA-WD in the first embodiment is an example of the claimed "first screen data". The screen data representing the error screen WE in the present embodiment is an example of the claimed "second screen data".

In S270 the management server 300 determines whether a desirable reference residual percentage (or percentages) TR was acquired through the screen displayed on the display unit 340. The reference residual percentage (or percentages) TR may be acquired when one of the settings screens WA-WD is displayed on the display unit 340, but cannot be acquired when the error screen WE is displayed on the display unit 340.

When a user-designated reference residual percentage (or percentages) TR was acquired (S270: YES), in S275 the management server 300 sets the reference residual percentage(s) TR acquired through the settings screen as the reference value(s) for the target printer(s), and subsequently ends the reference value setting process. Specifically, the management server 300 records the reference residual percentage(s) TR acquired through the settings screen in the entries of the management database PD corresponding to the target printers.

When a reference residual percentage TR was previously recorded in the management database PD for any entries corresponding to the target printers, the recorded reference residual percentage TR is deleted at this time. On the other hand, if a user-designated reference residual percentage (or percentages) TR was not acquired (S270: NO), the management server 300 ends the reference value setting process without executing step S275.

<A-2-5. Settings Screens and Error Screen>

Figure 9:
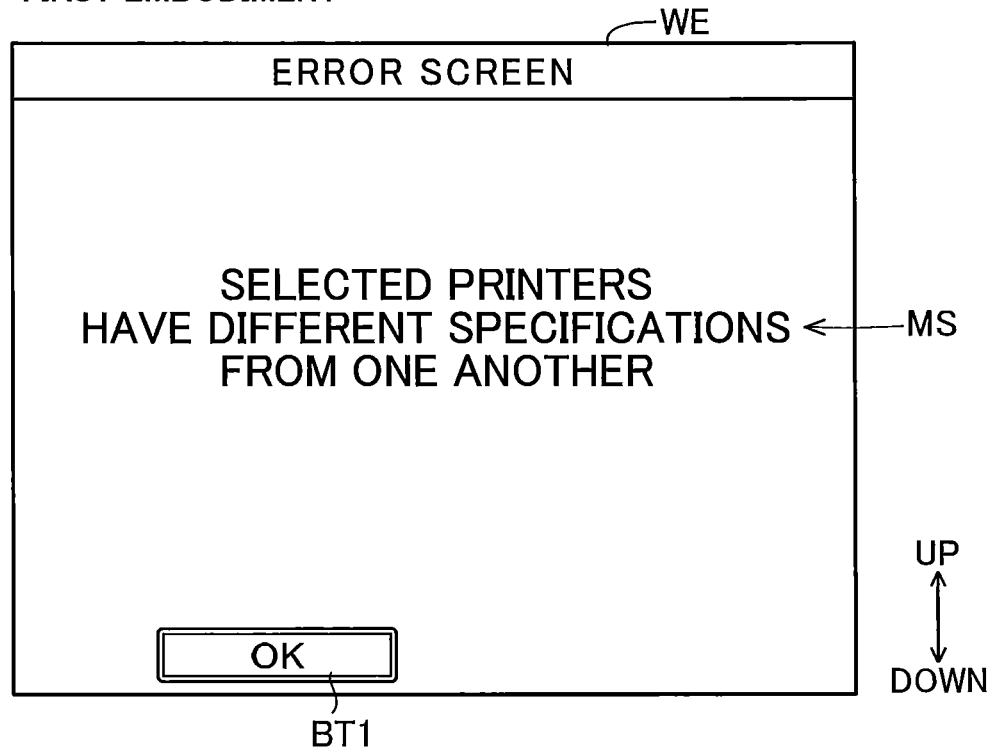
FIG. 9 illustrates an example of an error screen WE displayed by the management server 300 according to the first embodiment.

Here, the settings screens WA-WD and the error screen WE used in the reference value setting process will be described. FIGS. 8A, 8B, 8C, and 8D show examples of settings screens according to the first embodiment. FIG. 9 shows an example of the error screen.

The settings screen WA in FIG. 8A is used when the one or more target printers all employ a single-chamber supply system and all have the same initial ink volume IV.

The settings screen WA includes a user interface (UI) image Ia, an OK button BT1, and a Cancel button BT2. The UI image Ia includes a bar-shaped object Oa, and a slider SDs arranged on the object Oa. Elements, such as sliders and buttons that are provided in the settings screen for receiving user operations, are called input elements, UI components, and widgets.

The object Oa represents a specific range of possible residual ink percentages IR. Longitudinal (vertical in FIG. 8A) positions along the object Oa correspond to possible values of the residual ink percentage IR. The upper end of the object Oa corresponds to 100%, while the bottom end of the object Oa corresponds to 0% (i.e., the minimum value for the residual ink percentage IR).

Note that, since the entire range of possible residual ink percentages IR ranges from 0% to a percentage greater than 100% as described above, the specific range represented by the object Oa is a part of the entire range. That is, in the present embodiment, the object Oa represents a part of the entire range of possible residual ink percentages IR. Alternatively, the object Oa may represent the entire range of possible residual ink percentages IR. In this case, the upper end of the object Oa corresponds to the maximum value (more than 100%) for the residual ink percentage IR, while the bottom end of the object Oa corresponds to the minimum value (0%).

The slider SDs indicates the user-designated reference residual percentage TR within the specific range of values represented by the object Oa. The slider SDs is moved over the object Oa in the longitudinal direction (vertical direction in FIG. 8A) thereof in response to move commands inputted by the user. As will be described later, move commands may be implemented through mouse input, for example. By moving the slider SDs, the user can adjust (change) the reference residual percentage TR. A numerical value ST ("5%" in the example of FIG. 8A) displayed near the slider SDs in the settings screen WA specifies the reference residual percentage TR corresponding to the position of the slider SDs. The longitudinal direction (i.e., the vertical direction in the present embodiment) is an example of the claimed "specific direction".

The slider SDs may be considered an input element with which the user can designate a desired reference residual percentage TR. When the user adjusts the position of the slider SDs to correspond to a desired reference residual percentage TR and presses the OK button BT1, the user-specified reference residual percentage TR is inputted on the basis of the position of the slider SDs when the OK button BT1 was pressed. That is, the management server 300 (the CPU 310) acquires, as a single user-specified reference residual percentage TR, the reference residual percentage TR corresponding to the position of the slider SDs at the moment the OK button BT1 was pressed. In other words, the user can input a single instruction using the single slider SDs to specify a desired reference residual percentage TR.

When the management server 300 acquires a desired reference residual percentage TR through the settings screen WA, in S275 of FIG. 7, the management server 300 sets the acquired reference residual percentage TR as the reference residual percentage TR corresponding to the one or more target printers. Since the reference residual percentage TR is set for all target printers when there is a plurality of target printers, a single instruction inputted via the settings screen WA is a common instruction used for all of the target printers.

The settings screen WB in FIG. 8B is used when two or more target printers all employ a single-chamber supply system, and the two or more target printers are either printers whose initial ink volume IV is a first quantity or printers whose initial ink volume IV is a second quantity smaller than the first quantity.

The settings screen WB includes a UI image Ib, an OK button BT1, and a Cancel button BT2. The UI image Ib includes two bar-shaped objects Ob1 and Ob2, and a single slider SDI arranged across both objects Ob1 and Ob2.

The object Ob1 represents a specific range of possible values of the residual ink percentage IR for the one or more target printers whose initial ink volume IV is the first quantity. The object Ob2 represents a specific range of possible values of the residual ink percentage IR for the one or more target printers whose initial ink volume IV is the second quantity.

The objects Ob1 and Ob2 are displayed in the settings screen WB such that their longitudinal (vertical in FIG. 8B) lengths are proportional to the respective first quantity and second quantity. In other words, in the settings screen WB, the ratio of the longitudinal length of the object Ob1 to the longitudinal length of the object Ob2 is set equal to the ratio of the first quantity to the second quantity. Hence, the objects Ob1 and Ob2 can be considered two indications for initial ink volumes IV of the two or more target printers. The objects Ob1 and Ob2 are displayed such that the bottom end of the object Ob1 (i.e., the longitudinal position corresponding to the lowest possible value of the residual ink percentage IR) is aligned with the bottom end of the object Ob2. In other words, in the settings screen WB, the bottom ends of the objects Ob1 and Ob2 are arranged at the same position in the longitudinal direction (in the vertical direction in FIG. 8B).

The slider SDI specifies desired reference residual percentages TR within the specific ranges represented by the objects Ob1 and Ob2. Since the longitudinal length of the object Ob2 is shorter than that of the object Ob1 in the settings screen WB, the range of movement of the slider SDI is limited to the longitudinal length of the object Ob2. As with the settings screen WA, the user can move the slider SDI to adjust the reference residual percentages TR.

A numerical value ST1 ("12%" in the example of FIG. 8B) is displayed to the left of the slider SDI to indicate the reference residual percentage TR corresponding to the position of the slider SDI in the object Ob1. A numerical value ST2 ("24%" in the example of FIG. 8B) is displayed to the right of the slider SDI to indicate the reference residual percentage TR corresponding to the position of the slider SDI in the object Ob2.

When the user presses the OK button BT1, the reference residual percentages TR corresponding to the position of the slider SDI at the time the OK button BT1 was pressed are inputted as the desired reference residual percentages TR. That is, the management server 300 acquires, as the user-designated reference residual percentages TR, two reference residual percentages TR corresponding to the position of the slider SDI at the moment the OK button BT1 was pressed. In other words, the user can input a single instruction via a single slider SDI to designate two desired reference residual percentages TR.

After the management server 300 acquires the two desired reference residual percentages TR through the settings screen WB, in S275 the management server 300 sets one of the reference residual percentages TR (12%, for example) as the reference residual percentage TR corresponding to target printers whose initial ink volume IV is the first quantity, and sets the other value (24%, for example) as the reference residual percentage TR corresponding to the target printers whose initial ink volume IV is the second quantity. In this way, a single instruction inputted via the settings screen WB to specify two reference residual percentages TR is a common instruction used for all of target printers.

Note that since the settings screen WB is the screen used when the two or more target printers have initial ink volumes IV of two different quantities (a first quantity and a second quantity), the UI image Ib includes two objects Ob1 and Ob2. If there are three or more target printers having initial ink volumes IV of three different quantities, the UI image Ib in the settings screen WB would include three objects whose longitudinal lengths correspond to the three different quantities, and a single slider arranged across all three objects. That is, when the initial ink volumes IV of M target printers (where M is an integer of 2 or greater) are M different quantities, the UI image Ib displayed in the settings screen WB includes M objects corresponding to the M quantities, and a single slider arranged across the M objects.

The settings screen WC in FIG. 8C is used when the one or more target printers all employ a double-chamber supply system, and all of the one or more target printers have the same initial ink volume IV and the same boundary volume BV.

The settings screen WC includes a UI image Ic, an OK button BT1, and a Cancel button BT2. As with the UI image Ia in the settings screen WA, the UI image Ic includes a bar-shaped object Oc, and a slider SDs arranged on the object Oc.

As with the object Oa in the settings screen WA, the object Oc indicates a specific range of possible values for the residual ink percentage IR. The object Oc includes a boundary line Lc. The boundary line Lc is disposed at a longitudinal position along the object Oc corresponding to the boundary residual percentage BR. As described above, the boundary residual percentage BR is calculated using the initial ink volume IV and boundary volume BV (BR=(BV/IV)×100). The boundary residual percentage BR may be thought of as the residual ink percentage IR corresponding to the boundary volume BV. Thus, the object Oc may be considered an indication for the initial ink volume IV and boundary volume BV of the one or more target printers.

The slider SDs indicates the user-specified reference residual percentage TR within the specific range represented by the object Oc. A numerical value ST ("20%" in the example of FIG. 8C) displayed near the slider SDs indicates the reference residual percentage TR corresponding to the position of the slider SDs. The user can input a single command using the slider SDs for setting a single desired reference residual percentage TR.

When there is a plurality of target printers, in S275 the management server 300 sets a reference residual percentage TR for all of the target printers. Hence, the single instruction inputted through the settings screen WC is a common instruction used for all of the target printers, just as an instruction inputted through the settings screen WA.

The settings screen WD in FIG. 8D is used when the two or more target printers all employ a double-chamber supply system, the initial ink volume IV of each of the two or more printers is either a third quantity or a fourth quantity smaller than the third quantity, and the two or more target printers all have the same boundary volume BV.

The settings screen WD includes a UI image Id, an OK button BT1, and a Cancel button BT2. As with the settings screen WB, the UI image Id includes two bar-shaped objects Od1 and Od2, and a single slider SDI arranged across the two objects Od1 and Od2. Each of the objects Od1 and Od2 is an example of the claimed "first indication". The slider SDI is an example of the claimed "second indication".

The object Od1 represents a specific range of possible values of the residual ink percentage IR for the one or more target printers whose initial ink volume IV is the third quantity. The object Od2 represents a specific range or possible values of the residual ink percentage IR for the one or more target printers whose initial ink volume IV is the fourth quantity.

The objects Od1 and Od2 are displayed in FIG. 8D with longitudinal (vertical in FIG. 8D) lengths that are proportional to the respective third quantity and fourth quantity. In other words, the ratio of the longitudinal length of the objects Od1 to the longitudinal length of the object Od2 is set equal to the ratio of the third quantity to the fourth quantity.

The objects Od1 and Od2 also include boundary lines Ld1 and Ld2, respectively. As with the boundary line Lc in the settings screen WC, the boundary line Ld1 is disposed at a longitudinal position along the object Od1 corresponding to the boundary residual percentage BR of the one or more target printers whose initial ink volume IV is the third quantity, and the boundary line Ld2 is disposed at a longitudinal position along the object Od2 corresponding to the boundary residual percentage BR of the one or more target printers whose initial ink volume IV is the fourth quantity. Each of the boundary lines Ld1 and Ld2 is an example of the claimed "third indication".

As described above, the boundary residual percentage BR is calculated using the initial ink volume IV and boundary volume BV. Thus, the objects Od1 and Od2 may be considered two indications related to the initial ink volume IV and boundary volume BV for the two or more target printers.

The objects Od1 and Od2 are arranged such that the longitudinal position of the bottom end of the object Od1 is aligned with the longitudinal position of the bottom end of the object Od2. In other words, in the settings screen WD, the bottom ends of the objects Od1 and Od2 are arranged at the same position in the longitudinal direction (in the vertical direction in FIG. 8D).

As described above, the ratio of the longitudinal length of the object Od1 to the longitudinal length of the object Od2 is equivalent to the ratio of the third quantity to fourth quantity, and all of the target printers have the same boundary volume BV. Therefore, the two boundary lines Ld1 and Ld2 are arranged at the same longitudinal position.

As in the settings screen WB, the slider SDI in the settings screen WD indicates the user-designated reference residual percentages TR within the specific ranges represented by the objects Od1 and Od2. As in the settings screen WB, the user can move the slider SDI to adjust the reference residual percentages TR.

A numerical value ST1 ("23%" in the example of FIG. 8D) displayed to the left of the slider SDI indicates the reference residual percentage TR corresponding to the position of the slider SDI in the object Od1. Similarly, a numerical value ST2 ("30%" in the example of FIG. 8D) displayed to the right of the slider SDI indicates the reference residual percentage TR corresponding to the position of the slider SDI in the object Od2.

When the user presses the OK button BT1, the two desired reference residual percentages TR corresponding to the position of the slider SDI are inputted. In other words, the user can input a single command using the single slider SDI to specify two reference residual percentages TR.

When the management server 300 acquires the two user-designated reference residual percentages TR through the settings screen WD, in S275 the management server 300 sets the value of one acquired reference residual percentage TR (23%, for example) as the reference residual percentage TR corresponding to the target printers having an initial ink volume IV of the third quantity, and sets the value of the other reference residual percentage TR (30%, for example) as the reference residual percentage TR corresponding to the target printers having an initial ink volume IV of the fourth quantity. Thus, the single instruction inputted in the settings screen WD for specifying two reference residual percentages TR is a common instruction used for all of the plurality of target printers.

Note that, since the settings screen WD is a settings screen used when the two or more target printers have two different types of initial ink volumes IV (the third quantity and fourth quantity), the UI image Id displayed in the settings screen WD includes two objects Od1 and Od2. That is, as described for the settings screen WB, when M target printers (where M is an integer of two or greater) have M different types of initial ink volumes IV, the UI image in the settings screen WD includes M objects corresponding to the M different volumes, and a single slider arranged across the M objects.

FIG. 9 shows an example of an error screen. The error screen WE in FIG. 9 includes a message MS, and an OK button BT1. The message MS indicates that a boundary residual percentage BR cannot be set because printers with different specifications have been selected as the process targets.

In a case where the error screen WE is displayed on the display unit 340, the management server 300 skips S275, and hence does not set the boundary residual percentage BR. In this case, the user selects, as a new target printer or new target printers, one or more printers that are at least partially different from the target printers in the current setting process, and reissues a start request for the reference value setting process.

The error screen WE differs from the settings screens WA-WD in that the error screen WE does not include input elements (sliders SDs and SDI) for inputting a common instruction specifying desired reference residual percentages TR. Therefore, the error screen WE is a screen through which the user cannot input a common instruction.

In the reference value setting process of FIG. 7 according to the first embodiment described above, the management server 300 determines whether all of the target printers are of the same type on the basis of printer information recorded in the management database PD shown in FIG. 4 (S210-S230 of FIG. 7). When the target printers are of the same type (S215: NO, S225: YES, or S230: YES in FIG. 7), the management server 300 generates screen data representing one of the settings screens WA-WD and displays a settings screen based on this data (S235-S250, S260, and S265 of FIG. 7). As described above, the settings screens WA-WD are settings screens through which the user can input an instruction common to the plurality of target printers (see FIG. 8). The management server 300 sets the plurality of reference residual percentages TR corresponding to the plurality of target printers based on this common instruction (S275 of FIG. 7). If the types of the target printers are not the same (S210: NO or S230: NO in FIG. 7), the management server 300 generates screen data representing the error screen WE and displays this error screen WE (S255, S260, and S265 in FIG. 7). The error screen WE is a screen in which the user is not able to input a common instruction. Thus, the management server 300 provides the user with a suitable screen depending on whether the types of all target printers match. Hence, this technique facilitates the setting of a reference residual percentage TR for determining whether the replenishment condition for the ink Ik has been met. For example, if the plurality of target printers match in type (i.e., if all of the plurality of target printers have the same type), the user can input a common instruction in one of the settings screens WA-WD, thereby easily setting a plurality of reference residual percentages TR corresponding to the plurality of printers.

More specifically, the management server 300 determines that the target printers are of the same type (S210-S230 of FIG. 7) when a matching condition that includes the condition that the target printers have the same ink Ik supply systems (S210 of FIG. 7) is met. Accordingly, the management server 300 can provide the user with a suitable screen depending on whether the ink Ik supply systems of the target printers match. For example, from the perspective of preventing ink wastage, there is no reason for setting the reference residual percentage TR to a value less than the boundary residual percentage BR for printers employing double-chamber supply systems. For this reason, the reference residual percentage TR should be set to a value greater than or equal to the boundary residual percentage BR. On the other hand, for printers employing single-chamber supply systems, the reference residual percentage TR is preferably set closer to 0% from the perspective of preventing the wastage of ink Ik and is preferably set to a large value from the perspective of preventing print stoppage. Owing to these differences, it is often difficult to set suitable reference residual percentages TR for printers having single-chamber supply systems and printers having double-chamber supply systems on the basis of a single common instruction. However, since the present embodiment employs the matching condition including the condition that the ink Ik supply systems of the target printers match, a suitable screen can be provided to the user.

The management server 300 displays the settings screen WC or WD when a matching condition including a condition that the target printers all employ a double-chamber supply system (S215: YES in FIG. 7) is met. As described above, the settings screen WD in FIG. 8D is displayed when the target printers include two or more printers with different initial ink volumes IV from one another (S225: NO, S230: YES). The settings screen WD includes: two objects Od1 and Od2 corresponding to the two or more target printers having different initial ink volumes IV; and a single slider SDI specifying, in association with the two objects Od1 and Od2, user-designated reference residual percentages TR based on a common instruction (i.e., reference residual percentages TR to be set on the basis of a common instruction). Thus, for example, by viewing the objects Od1 and Od2, the user can recognize the difference in initial ink volumes IV in the plurality of target printers while inputting a common instruction, thereby easily setting suitable reference residual percentages TR for target printers having different initial ink volumes IV.

Further, the settings screen WD includes the boundary lines Ld1 and Ld2 specifying boundary residual percentages BR (FIG. 8D). The objects Od1 and Od2 are arranged in the settings screen WD such that the corresponding boundary lines Ld1 and Ld2 are aligned at the same vertical position. Thus, the user can reference the positions of the boundary residual percentages BR while inputting a common instruction, thereby more easily setting suitable reference residual percentages TR. Additionally, a reference value can be more easily set when the reference value is set for an index value indicating one of the residual quantity of printing agent and the ratio of the residual quantity of printing agent to the storage capacity for the printing agent.

When the reference residual percentage TR is used as the reference value, it may be difficult to set suitable reference residual percentages TR based on a single common instruction for two or more printers having different boundary volumes BV, even if the printers all employ double-chamber supply systems. That is, the length of time that a printer can continue printing after the total residual ink quantity of ink drops to the boundary volume BV differs among printers having different boundary volumes BV, making it preferable to order ink cartridges for the different printers at different timings. In the present embodiment, the management server 300 determines that the types of target printers match when the target printers all employ a double-chamber supply system (S215: YES in FIG. 7) and all have the same boundary volume BV (S225: YES or S230: YES). This facilitates the setting of suitable reference residual percentages TR when the reference residual percentage TR is employed as the reference value.

In the first embodiment described above, the management server 300 displays the error screen WE (see FIG. 8D; S255-S265 in FIG. 7) indicating that the reference residual percentage TR cannot be set due to an error when the target printers are of different types (e.g., S210: YES in FIG. 7). In this way, the error screen WE is displayed when it is difficult to set suitable reference residual percentages TR, enabling the user to take appropriate measures. For example, the user can reselect a plurality of target printers and input another start request to start the reference value setting process.

In the first embodiment described above, the management server 300 displays one of the settings screen WA or WB when the plurality of target printers all employ a single-chamber supply system (S215: NO in FIG. 7). As described above, the settings screen WB in FIG. 8B is displayed when the target printers include two or more printers having different initial ink volumes IV from one another (S220: NO). The settings screen WB includes: two objects Ob1 and Ob2 corresponding to the two or more target printers having different initial ink volumes IV; and a single slider SDI indicating, in association with the two objects Ob1 and Ob2, user-designated reference residual percentages TR based on a common instruction (i.e., reference residual percentages TR to be set on the basis of a common instruction). Accordingly, the user can input a common instruction while recognizing the differences in initial ink volumes IV for the target printers by viewing the objects Ob1 and Ob2. Hence, the user can easily set suitable reference residual percentages TR for printers having different initial ink volumes IV.

B. Second Embodiment

In the second embodiment, the management server 300 uses a number of remaining printing days RD, in place of the residual ink percentage IR, as the index value for the total residual ink quantity that is used for determining whether the replenishment condition has been met. The remaining printing days RD is a number of days specifying a period of time that corresponds to the total residual ink quantity (or the residual ink percentage IR). Specifically, the remaining printing days RD for the printer 100A indicates the period of time in which printing will be possible without replacing the ink cartridge 200A. For example, a remaining printing days RD of ten days signifies that the printer 100A can continue printing for ten days from the current date without having the ink cartridge 200A replaced. The same is true with respect to the remaining printing days RD for the other printers in the system 1000. However, in the second embodiment, the index value for the total residual ink quantity that the management server 300 acquires from each of the plurality of printers under management in the system 1000 is the residual ink percentage IR, as in the first embodiment.

The remaining printing days RD is an example of the claimed "remaining printing period of time" and also is the claimed "index value".

Figure 10:
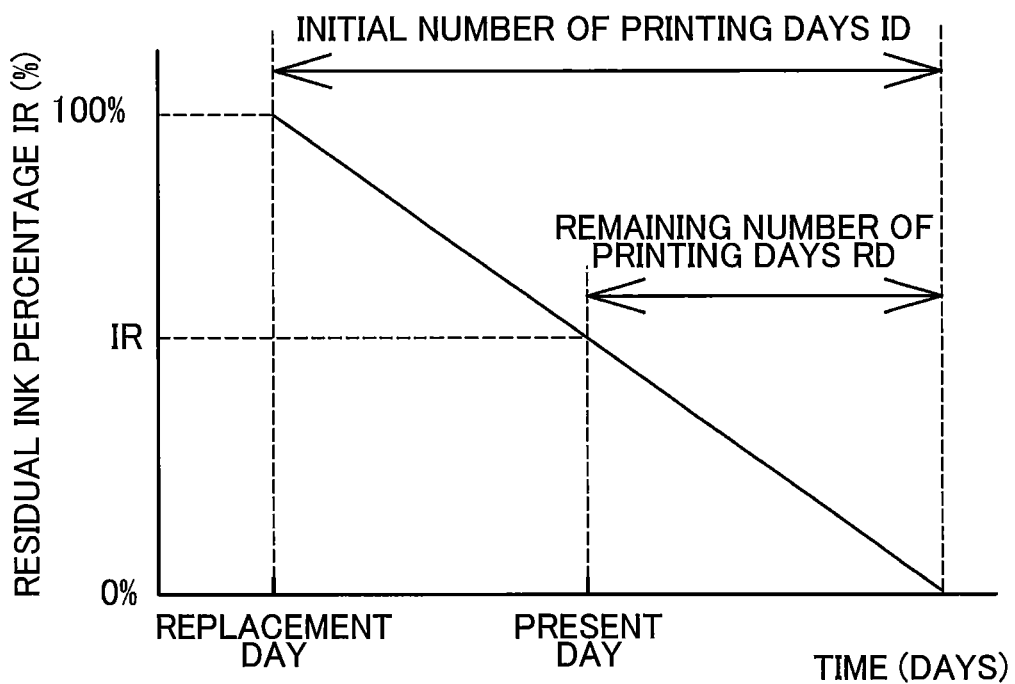
FIG. 10 is a graph for explaining how remaining printing days RD is calculated by a management server according to a second embodiment of the present disclosure.

FIG. 10 is a graph illustrating how the remaining printing days RD is calculated. Hereinafter, the method of calculating the remaining printing days RD for the printer 100A under management will be described as an example. Note that since the same method of calculating the remaining printing days RD is used for all of the plurality of printers (including the printers 100A, 100B, and 100C) under management in the system 1000, detailed descriptions of calculations of the remaining printing days RD for the other printers will be omitted.

The day on which the ink cartridge 200A was replaced with a new ink cartridge 200A will be called the "replacement day." In other words, the replacement day denotes the day on which the ink cartridge 200A currently attached to the attachment portion 172A was initially attached to the same.

In the calculation of the remaining printing days RD for the printer 100A, although the residual ink percentage in the printer 100A on the replacement day is actually greater than or equal to 100%, the actual residual ink percentage on the replacement day is rounded to exactly 100% and the rounded percentage (i.e., 100%) is used as the residual ink percentage on the replacement day. The same is true with respect to the remaining printing days RD for the printers employing a double-chamber supply system. Note that, the actual residual ink percentage on the replacement day in the printers employing a single-chamber supply system is 100% because these printers are not provided with an intermediate container.

As described above, in the calculations of the remaining printing days RD for the printers 100A and other printers employing a double-chamber supply system, the rounded residual ink percentage (i.e., 100%) is used as the residual ink percentage on the replacement day; however, the actual residual ink percentage on the replacement day may be used, in place of the rounded percentage (i.e., 100%), as the residual ink percentage on the replacement day.

Further, the current residual ink percentage is the residual ink percentage IR recorded in a management database PD2 described later (the residual ink percentage IR acquired from the printer 100A). Assuming that the consumption of ink Ik from the replacement day to the present day were to continue at the same rate, the remaining printing days RD can be calculated according to equation (1) below using the replacement day and the residual ink percentage IR.

$$RD = (UD \times IR)/(100-IR) \qquad (1)$$

Here, "UD" denotes the period of time (number of days) from the replacement day to the present day, and "100" denotes the residual ink percentage on the replacement day.

Note that an initial number of printing days ID illustrated in FIG. 10 denotes the remaining printing days RD at the moment an old ink cartridge 200A is replaced with a new ink cartridge 200A. The initial number of printing days ID is calculated according to the following equation (2).

$$ID = (UD \times 100)/(100-IR) \qquad (2)$$

<B-1. Management Database PD2>

In the second embodiment, in order to determine whether the replenishment condition has been met on the basis of the remaining printing days RD, some of the information managed in the management database PD2 differs from information managed in the management database PD of the first embodiment.

FIG. 11 shows an example of the management database PD2 according to the second embodiment. As with the management database PD shown in FIG. 4, the management database PD2 includes entries corresponding to the plurality of printers under management in the system 1000. In FIG. 11, only entries EN1$b$, EN2$b$, and EN3$b$ corresponding to the printers 100A, 100B, and 100C, respectively, are displayed as representative examples.

As with the entry EN1 in FIG. 4, the entry EN1$b$ corresponding to the printer 100A includes a plurality of items of printer information for the printer 100A, and specifically a serial number, model name, IP address, acquired status, determined status, replacement count, ink Ik supply system, initial ink volume IV, boundary ink volume BV, and residual ink percentage IR. Note that the model name and IP address are not shown in the table of FIG. 11.

Further, the entry EN1$b$ corresponding to the printer 100A includes information specifying a reference number of days TD in place of the reference residual percentage TR included in the entry EN1 of FIG. 4. The reference number of days TD is used on the management server 300 for determining the status of the remaining printing days RD. The reference number of days TD is a threshold value for the remaining printing days RD and is set on the basis of a user instruction in the reference value setting process (FIG. 13) described later. The entry EN1$b$ does not include the reference number of days TD when the reference number of days TD has not yet been set. The reference number of days TD is an example of the claimed "reference value".

The entry EN1$b$ corresponding to the printer 100A also includes the replacement day described above, and a boundary number of printing days BD. The boundary number of printing days BD is an example of the claimed "boundary index value".

The boundary number of printing days BD is equivalent to the remaining printing days RD when ink Ik of the boundary ink volume BV remains in a printer employing a double-chamber supply system (the printers 100A and 100B, for example). In other words, the boundary number of printing days BD is the remaining printing days RD at the boundary between the first storage state S1 and second storage state S2. Assuming that ink consumed from the replacement day to the current day continues at the same rate, the boundary number of printing days BD is calculated according to equation (3) below using the replacement day, boundary residual percentage BR, and residual ink percentage IR described above. Note that, also in the calculation of the boundary number of printing days BD, the actual residual ink percentage on the replacement day is rounded to exactly 100% and the rounded percentage (i.e., 100%) is used as the residual ink percentage on the replacement day, as with the calculation of the remaining printing days RD. Alternatively, also in the calculation of the boundary number of printing days BD, the actual residual ink percentage on the replacement day may be used, in place of the rounded residual ink percentage, as the residual ink percentage on the replacement day.

$$BD = (UD \times BR)/(100-IR) \qquad (3)$$

Here, "UD" denotes the period of time (number of days) from the replacement day to the present day, and "100" denotes the residual ink percentage on the replacement day.

The entries EN2$b$ and EN3$b$ respectively corresponding to the printers 100B and 100C include information specifying the same items included in the entry EN1$b$ corresponding to the printer 100A. However, the printer 100C utilizes a single-chamber supply system and is not provided with an intermediate container. Therefore, the entry EN3b include neither the boundary ink volume BV nor boundary number of printing days BD.

Of the printer information recorded in the management database PD2, the acquired status, replacement count, replacement day, ink Ik supply system, initial ink volume IV, boundary ink volume BV, and residual ink percentage IR are acquired from each of the printers under management in a management process described later. Of the printer information recorded in the management database PD2, the determined status and the boundary number of printing days BD are generated in the management process described later. The reference number of days TD is set according to a reference value setting process described later.

<B-2. Management Process>

A management process according to the second embodiment will be described next. As with the management process of the first embodiment described above, the management process according to the second embodiment is periodically executed for each of the plurality of printers (including the printers 100A, 100B, and 100C) under management serving alternately as the processing target printer. The following description covers an example in which the printer 100A is the processing target printer.

Figure 12:
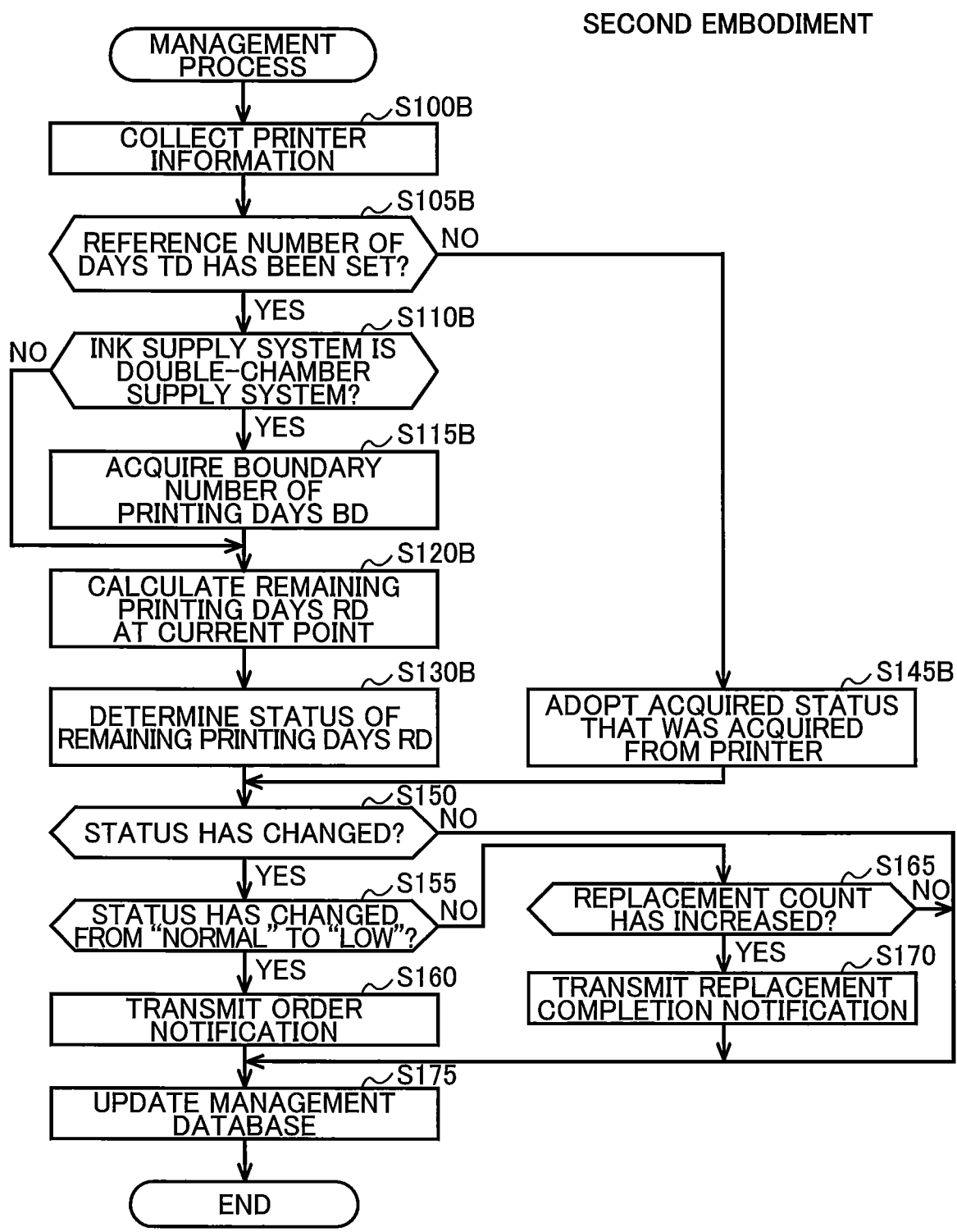
FIG. 12 is a flowchart illustrating steps in a management process performed by the management server according to the second embodiment.

FIG. 12 is a flowchart illustrating steps in the management process according to the second embodiment. Since the steps beginning from S150 in FIG. 12 are the same as those described in the management process of FIG. 5, these steps are designated with the same step numbers to avoid duplicating description. For steps in FIG. 12 prior to S150, a "B" has been appended to the step number used in the management process of FIG. 5. In the management process according to the second embodiment shown in FIG. 12, steps S100B-S145B are executed in place of steps S100-S145 in the management process according to the first embodiment shown in FIG. 5.

In S100B, as in S100 of FIG. 5, the management server 300 collects printer information from the printer 100A, which is the target printer in this example. Printer information is collected using SNMP, as in the first embodiment. The management server 300 records the collected printer information in the volatile storage device 120. As described above, the printer information collected in the second embodiment includes the acquired status, replacement count, replacement day, ink Ik supply system, initial ink volume IV, boundary ink volume BV, and residual ink percentage IR, differing somewhat from the first embodiment.

In S105B the management server 300 determines whether the reference number of days TD has been set for the target printer (the printer 100A in this example). When a reference number of days TD is recorded in the management database PD2, the management server 300 determines that a reference number of days TD has been set. The management server 300 advances to S110B when a reference number of days TD has been set (S105B: YES) and advances to S145B when a reference number of days TD has not yet been set (S105B: NO).

In S110B, as in S110 of FIG. 5, the management server 300 determines whether the ink Ik supply system in the target printer is a double-chamber supply system on the basis of information in the collected printer information specifying the ink Ik supply system. When the ink Ik supply system is a double-chamber supply system (S110B: YES), the management server 300 advances to S115B.

In S115B the management server 300 calculates the boundary number of printing days BD according to equation (3) described above using the replacement day, boundary residual percentage BR, and residual ink percentage IR acquired in S110B. The boundary number of printing days BD varies depending on a condition of printing executed on the printer 100A (i.e., the condition of ink Ik consumption in the printer 100A). Accordingly, the boundary number of printing days BD is calculated each time the management process is performed.

On the other hand, when the ink Ik supply system is not a double-chamber supply system (S110B: NO), i.e., when the ink Ik supply system is a single-chamber supply system, the management server 300 skips S115B and advances to S120B. In other words, the management server 300 does not calculate the boundary number of printing days BD when the ink Ik supply system of the target printer is a single-chamber supply system (for example, when the target printer is the printer 100C). This is because the print executing unit employing a single-chamber supply system (for example, the print executing unit 170C illustrated in FIG. 3) does not include an intermediate container and thus the concepts of boundary ink volume BV, boundary residual percentage BR, and boundary number of printing days BD do not exist in a single-chamber supply system.

In S120B the management server 300 calculates the remaining printing days RD at the current point in time on the basis of equation (1) described above using the replacement day and residual ink percentage IR acquired in S110B.

In S130B the management server 300 determines the status of the remaining printing days RD on the basis of the remaining printing days RD and the reference number of days TD.

Specifically, if the target printer employs a single-chamber supply system, the management server 300 determines that the status of the remaining printing days RD is "normal" when the remaining printing days RD is greater than the reference number of days TD (RD>TD), and determines that the status is "low" when the remaining printing days RD is less than or equal to the reference number of days TD (RD≤TD).

On the other hand, if the target printer employs a double-chamber supply system, the management server 300 determines that the status of the remaining printing days RD is "normal" when the remaining printing days RD is greater than the sum of the boundary number of printing days BD and reference number of days TD (RD>(BD+TD)) and determines that the status is "low" when the remaining printing days RD is less than or equal to the sum of the boundary number of printing days BD and reference number of days TD (RD≤(BD+TD)).

As described above, the remaining printing days RD is compared with the reference number of days TD for a single-chamber supply system and is compared with the sum of the boundary number of printing days BD and reference number of days TD for a double-chamber supply system. This is because, for a single-chamber supply system, the reference number of days TD is set using as a reference (zero) the state in which the remaining printing days RD is zero, while for a double-chamber supply system, the reference number of days TD is set using as a reference (zero) the state in which the remaining printing days RD is equivalent to the boundary number of printing days BD.

If the reference number of days TD has not yet been set (S105B: NO), in S145B the management server 300 adopts, as the status of the remaining printing days RD, the acquired status acquired in S100 from the printer 100A.

<B-3. Reference Value Setting Process>

In the reference value setting process (FIG. 13) according to the second embodiment is a process of setting a reference number of days TD, in place of the reference residual percentage TR of the first embodiment, for the target printer as the reference value to be used in the management process described above.

Figure 13:
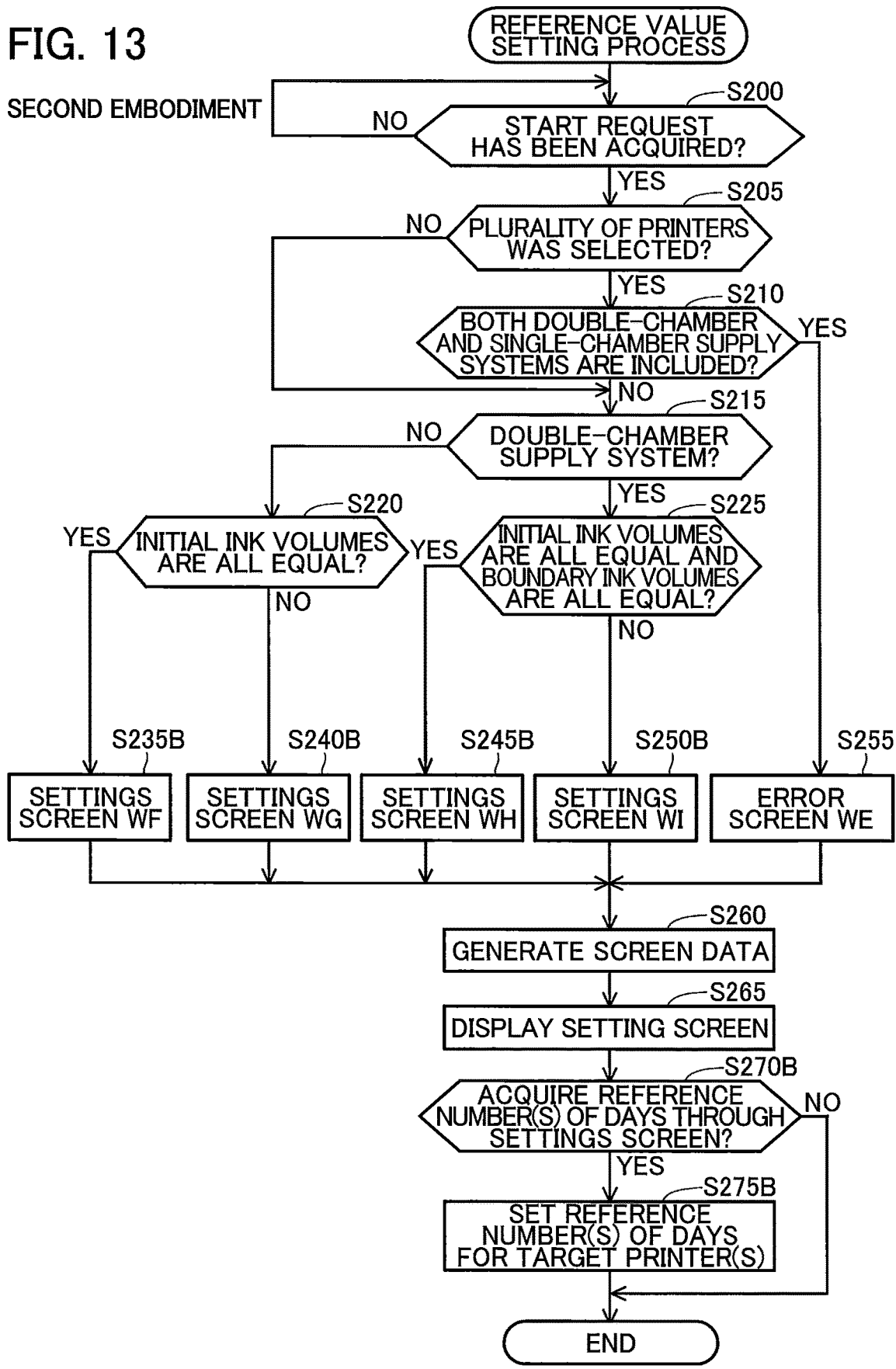
FIG. 13 is a flowchart illustrating steps in a reference value setting process performed by the management server according to the second embodiment.

In the reference value setting process of FIG. 13, step S230 of FIG. 7 is omitted, steps S235B-S250B are executed in place of steps S235-S250 of FIG. 7, and steps S270B and S275B are executed in place of steps S270 and S275 in FIG. 7. Therefore, the management server 300 advances to S250B when determining in S225 that either the initial ink volumes IV of the target printers include two or more different values or the boundary volumes BV of the target printers include two or more different values (S225: NO).

In S235B, the management server 300 sets a settings screen WF as the screen to be displayed in place of the settings screen WA. In S240B, the management server 300 sets a settings screen WG as the screen to be displayed in place of the settings screen WB. In S245B, the management server 300 sets a settings screen WH as the screen to be displayed in place of the settings screen WC. In S250B, the management server 300 sets a settings screen WI as the screen to be displayed in place of the settings screen WD. Each of the settings screens WF-WI in the second embodiment is an example of the claimed "first screen". The error screen WE in the second embodiment is an example of the claimed "second screen". The screen data representing one of the settings screens WF-WI in the second embodiment is an example of the claimed "first data". The screen data representing the error screen WE in the second embodiment is an example of the claimed "second screen data".

In S270B the management server 300 acquires reference numbers of days TD through one of the settings screens WF-WI. In S275B the management server 300 sets the reference numbers of days TD acquired through one of the settings screens WF-WI as the reference values for the target printers.

FIGS. 14A, 14B, 14C, and 14D show examples of the settings screens according to the second embodiment. The settings screen WF in FIG. 14A is used when the one or more target printers all employ a single-chamber supply system and the initial ink volumes IV of the one or more target printers are all the same.

The settings screen WF includes a UI image If, an OK button BT1, and a Cancel button BT2. The UI image If includes a bar-shaped object Of, and a slider SDs arranged on the object Of.

The object Of indicates the specific range of possible values for the remaining printing days RD. Specifically, longitudinal (vertical in FIG. 14A) positions along the object Of correspond to possible values of the remaining printing days RD. The bottom end of the object Of corresponds to the minimum value of the remaining printing days RD (0 days). Note that, since the specific range represented by the object Of is a part of the entire range of possible values for the remaining printing days RD, the top end of the object Of does not correspond to the maximum value of the remaining printing days RD (i.e., the initial number of printing days ID).

The slider SDs indicates the desired reference number of days TD within the specific range represented by the object Of. A numerical value DT ("2 days" in the example of FIG. 14A) displayed near the slider SDs specifies the reference number of days TD corresponding to the position of the slider SDs. The user can input a single instruction using the slider SDs to specify a single desired reference number of days TD. When there is a plurality of target printers, the reference number of days TD is set for all of the target printers. Thus, a single instruction inputted through the settings screen WF is a common instruction used for all of the target printers.

The settings screen WG in FIG. 14B is used when the two or more target printers all employ a single-chamber supply system and include printers with different initial ink volumes IV from one another.

The settings screen WG includes a UI image Ig, an OK button BT1, and a Cancel button BT2. The UI image Ig includes two bar-shaped objects Og1 and Og2, and a single slider SDI arranged across both objects Og1 and Og2.

The object Og1 represents a specific range of possible numbers of remaining printing days RD for the one or more target printers whose initial ink volume IV is a first quantity. The object Og2 represents a specific range of possible numbers of remaining printing days RD for the one or more target printers whose initial ink volume IV is a second quantity smaller than the first quantity.

In the settings screen WG, the ratio of the longitudinal length (the vertical length in FIG. 14B) of the object Og1 to the longitudinal length of the object Og2 is set equal to the ratio of the initial ink volume IV (the first quantity in this example) of the target printer(s) associated with the object Og1 to the initial ink volume IV (the second quantity in this example) of the target printer(s) associated with the object Og2. With this configuration, magnitudes of the initial ink volumes IV of the two or more target printers can be visualized, thereby enabling the user to intuitively and easily recognize the initial ink volumes IV of the two or more target printers.

A numerical value DT ("3 days" in the example of FIG. 14B) displayed to the left of the slider SDI specifies the reference number of days TD corresponding to the position of the slider SDI in the objects Og1 and Og2. The user can input a single instruction using the slider SDI to specify a single desired reference number of days TD. The single instruction inputted via the settings screen WG is a common instruction used for all of the target printers.

The settings screen WH in FIG. 14C is used when the one or more target printers all employ a double-chamber supply system, the one or more target printers all have the same initial ink volumes IV, and the one or more target printers all have the same boundary volumes BV.

The settings screen WH includes a UI image Ih, an OK button BT1, and a Cancel button BT2. As with the UI image If in the settings screen WF, the UI image Ih includes a bar-shaped object Oh, and a slider SDs arranged on the object Oh.

As with the object Of in the settings screen WF, the object Oh represents a specific range of possible values for the numbers of remaining printing days RD. The object Oh further includes a boundary line Lh. The boundary line Lh is disposed at a longitudinal position along the object Oh that corresponds to the boundary number of printing days BD. As described above, the reference number of days TD is set using, as a reference (zero), the state in which the remaining printing days RD is equivalent to the boundary number of printing days BD. Therefore, text specifying "0 days" is displayed near the boundary line Lh.

As described above, the boundary number of printing days BD is calculated using the boundary residual percentage BR, and the boundary residual percentage BR is calculated using the initial ink volume IV and boundary volume BV (BR=(BV/IV)×100). Thus, the object Oh may be considered an indication related to the initial ink volume IV and boundary volume BV of the one or more target printers.

A numerical value DT ("3 days" in the example of FIG. 14C) displayed to the left of the slider SDs indicates the reference number of days TD corresponding to the position of the slider SDs. The user can input a single instruction using the single slider SDs to designate a single desired reference residual percentage TR. As with the instruction inputted through the settings screen WF, the single instruction inputted through the settings screen WH is a common instruction used for all of the target printers.

The settings screen WI in FIG. 14D is used when the two or more target printers all employ a double-chamber supply system, and when at least one of the initial ink volumes IV and boundary volumes BV differs among the two or more target printers.

The settings screen WI includes a UI image Ii, an OK button BT1, and a Cancel button BT2. As with the settings screen WG, the UI image Ii includes two bar-shaped objects Oi1 and Oi2, and a single slider SDI arranged across the two objects Oi1 and Oi2. Each of the objects Oi1 and Oi2 is an example of the claimed "first indication". The slider SDI is an example of the claimed "second indication".

The objects Oi1 and Oi2 represent specific ranges of possible values of numbers of remaining printing days RD for the two or more target printers. In the settings screen WI, the ratio of the longitudinal length (the vertical length in FIG. 14D) of the object Oi1 to the longitudinal length of the object Oi2 is set equal to the ratio of the initial ink volume IV of the target printer(s) associated with the object Oi1 to the initial ink volume IV of the target printer(s) associated with the object Oi2. This configuration can visualize magnitudes of the initial ink volumes IV of the two or more target printers. Accordingly, the user can intuitively and easily recognize the initial ink volumes IV of the two or more target printers.

The objects Oi1 and Oi2 include boundary lines Li1 and Li2, respectively. As with the boundary line Lh in the settings screen WH, the boundary line Li1 is arranged at a longitudinal position along the object Oi1 that corresponds to the boundary number(s) of printing days BD of the target printer(s) associated with the object Oi1, and the boundary line Li2 is arranged at a longitudinal position along the object Oi2 that corresponds to the boundary number(s) of printing days BD of the target printer(s) associated with the object Oi2. The objects Oi1 and Oi2 can be considered two indications related to the initial ink volumes IV and boundary volumes BV of the two or more target printers. Each of the boundary lines Li1 and Li2 is an example of the claimed "third indication".

The objects Oi1 and Oi2 are displayed such that the two boundary lines Li1 and Li2 are arranged at the same longitudinal position.

A numerical value DT ("3 days" in the example of FIG. 14D) displayed to the left of the slider SDI in the settings screen WI indicates the reference numbers of days TD corresponding to the positions of the slider SDI within the objects Oi1 and Oi2. In the settings screen WI, the user can input a single instruction using the single slider SDI to specify a single desired reference numbers of days TD. As with the instruction inputted through the settings screen WG, a single instruction inputted through the settings screen WI is a common instruction used for all of the target printers.

In the second embodiment described above, the remaining printing days RD is used, in addition to the residual ink percentage IR, as the index value for the total residual ink quantity, and the remaining printing days RD corresponding to the boundary between the first storage state S1 and second storage state S2 is used as the boundary index value. Since a reference number of days TD is set for the remaining printing days RD, the user can easily set a suitable reference number of days TD. For example, the user can easily set a suitable reference number of days TD while considering the number of days required for a new ink cartridge 200A to reach the location of the printer 100A after an order notification for the ink cartridge 200A is transmitted.

When the target printers all employ double-chamber supply systems and the reference value (the reference number of days TD in the second embodiment) is set for the remaining printing days RD, there is a high probability that the same reference number of days TD will be set by the user irrespective of the initial ink volume IV and boundary volume BV. This is because, it is highly likely that the reference number of days TD is set by the user in consideration for the number of days required for delivery of the ink cartridge using the boundary number of printing days BD as reference (zero), for example.

In the reference value setting process according to the second embodiment, when the target printers all employ double-chamber supply systems (S215: YES in FIG. 13), the management server 300 displays, regardless of their initial ink volumes IV and boundary volumes BV, the settings screen WH or WI in which a common instruction can be inputted (S245B, S250B). In other words, when the target printers all employ double-chamber supply systems, the management server 300 determines that all of the target printers have the same type irrespective of their initial ink volumes IV and boundary volumes BV. As a result, the reference number of days TD can be easily set for printers having double-chamber supply systems.

C. Variations of the Embodiments

While the descriptions have been made in detail with reference to the specific embodiments, it would be apparent to those skilled in the art that many modifications and variations may be made thereto. In the following description, various modifications of the embodiments will be described while focusing on differences between each modification and the above-described embodiments.

(1) The settings screens WA-WI in the embodiments described above (see FIGS. 9 and 13) are merely examples and may be modified as needed. FIGS. 15A, 15B, and 15C show variations of the settings screens.

A settings screen WI2 illustrated in FIG. 15A may be displayed in place of the settings screen WI according to the second embodiment (FIG. 14D). The settings screen WI2 includes a UI image Ii2 in place of the UI image Ii in the settings screen WI. As in the UI image Ii, the UI image Ii2 includes the two bar-shaped objects Oi1 and Oi2, and the slider SDI arranged across the objects Oi1 and Oi2.

While the objects Oi1 and Oi2 in the settings screen WI are displayed such that the two boundary lines Li1 and Li2 are arranged at the same longitudinal position, the objects Oi1 and Oi2 in the settings screen WI2 are displayed such that their bottom ends are at the same longitudinal position. The remaining configuration of the UI image Ii2 is identical to that of the UI image Ii. With this variation, the reference number of days TD can be easily set to a number of days that accounts for the number of days required for delivery of an ink cartridge using, as a reference (zero), the day on which the residual quantity of ink Ik reaches zero.

(2) In the settings screens WA-WI, desired reference values (desired reference residual percentages TR in the first embodiment, or the reference numbers of days TD in the second embodiment) are inputted through a slider SDs or SDI. However, desired reference values may instead be inputted through other types of input elements.

For example, a settings screen WI3 shown in FIG. 15B may be displayed in place of the settings screen WI according to the second embodiment. The settings screen WI3 in FIG. 15B differs from the settings screen WI in FIG. 14D with the inclusion of a box BX. The box BX is an input element used for inputting a desired reference number of days TD. In the settings screen WI3, the user can input an instruction specifying reference number of days TD by inputting a numerical value in the box BX rather than by operating the slider SDI. In addition, a line (or lines) not operated by the user may be displayed in the settings screen WI3 in place of the slider SDI. This line (or these lines) may be moved in accordance with the value inputted into the box BX, for example.

(3) A settings screen WK shown in FIG. 15C may be displayed in place of the error screen WE in the first embodiment described above. The settings screen WK is used when there are two target printers, one of which employs a single-chamber supply system and the other of which employs a double-chamber supply system. The settings screen WK includes a UI image Ij, an OK button BT1, and a Cancel button BT2. The UI image Ij includes two bar-shaped objects Ok1 and Ok2, a first slider SD1 arranged on the object Ok1, and a second slider SD2 arranged on the object Ok2.

The object Ok1 corresponds to the one printer employing the single-chamber supply system, while the object Ok2 corresponds to the other target printer employing the double-chamber supply system. The longitudinal (vertical in FIG. 15C) length of the object Ok1 indicates the initial ink volume IV of the one printer with the single-chamber supply system, and the longitudinal length of the object Ok2 indicates the initial ink volume IV of the other printer with the double-chamber supply system.

The object Ok2 includes a boundary line Lk2. The boundary line Lk2 is disposed at a longitudinal position along the object Ok2 that corresponds to the boundary residual percentage BR of the other target printer with the double-chamber supply system.

The first slider SD1 indicates the user-specified reference residual percentage TR within a specific range represented by the object Ok1. The second slider SD2 indicates the user-specified reference residual percentage TR within a specific range represented by the object Ok2. The first slider SD1 and second slider SD2 move independently according to user operations. By moving the sliders SD1 and SD2, the user can adjust the corresponding reference residual percentages TR.

A numerical value ST1 is displayed to the left of the first slider SD1, and a numerical value ST2 is displayed to the right of the second slider SD2. The numerical values ST1 and ST2 indicate the corresponding reference residual percentages TR.

When the user presses the OK button BT1, two user-specified reference residual percentages TR corresponding to the current positions of the sliders SD1 and SD2 are inputted. In other words, the management server 300 acquires, as the user-specified reference residual percentages TR, two reference residual percentages TR corresponding to the positions of the two sliders SD1 and SD2 at the moment the OK button BT1 is pressed. Thus, in the settings screen WK, the user can input two instructions through the two sliders SD1 and SD2 to specify two desired reference residual percentages TR.

In this case, the two instructions inputted through the settings screen WK are not common instructions. Therefore, as with the error screen WE, the settings screen WK does not include input elements for inputting a common instruction (e.g., the sliders SDs and SDI in the settings screens WA-WD and WF-WI). That is, as with the error screen WE, the settings screen WK is a screen in which the user cannot input a common instruction. However, the settings screen WK allows the user to input two instructions corresponding to the two target printers.

Since the settings screen WK is used when the number of target printers is exactly two, the UI image Ij displayed in the settings screen WK includes two objects Ok1 and Ok2. However, when the target printers are configured of K printers (where K is an integer of 2 or greater) having different types from one another, the UI image displayed in the settings screen WK includes K objects, and K sliders arranged respectively on the K objects. With this variation, in S275 of FIG. 7, the management server 300 sets K reference residual percentages TR corresponding to the respective K target printers based on K instructions. In this variation, reference residual percentages TR can be set based on user instructions, even when the types of the target printers do not match.

(4) The reference value setting process in the embodiments described above (FIGS. 7 and 13) are merely examples and may be modified as needed. For example, a simpler reference value setting process may be executed when all printers in the system 1000 employ only single-chamber supply systems or only double-chamber supply systems.

Figure 16A:
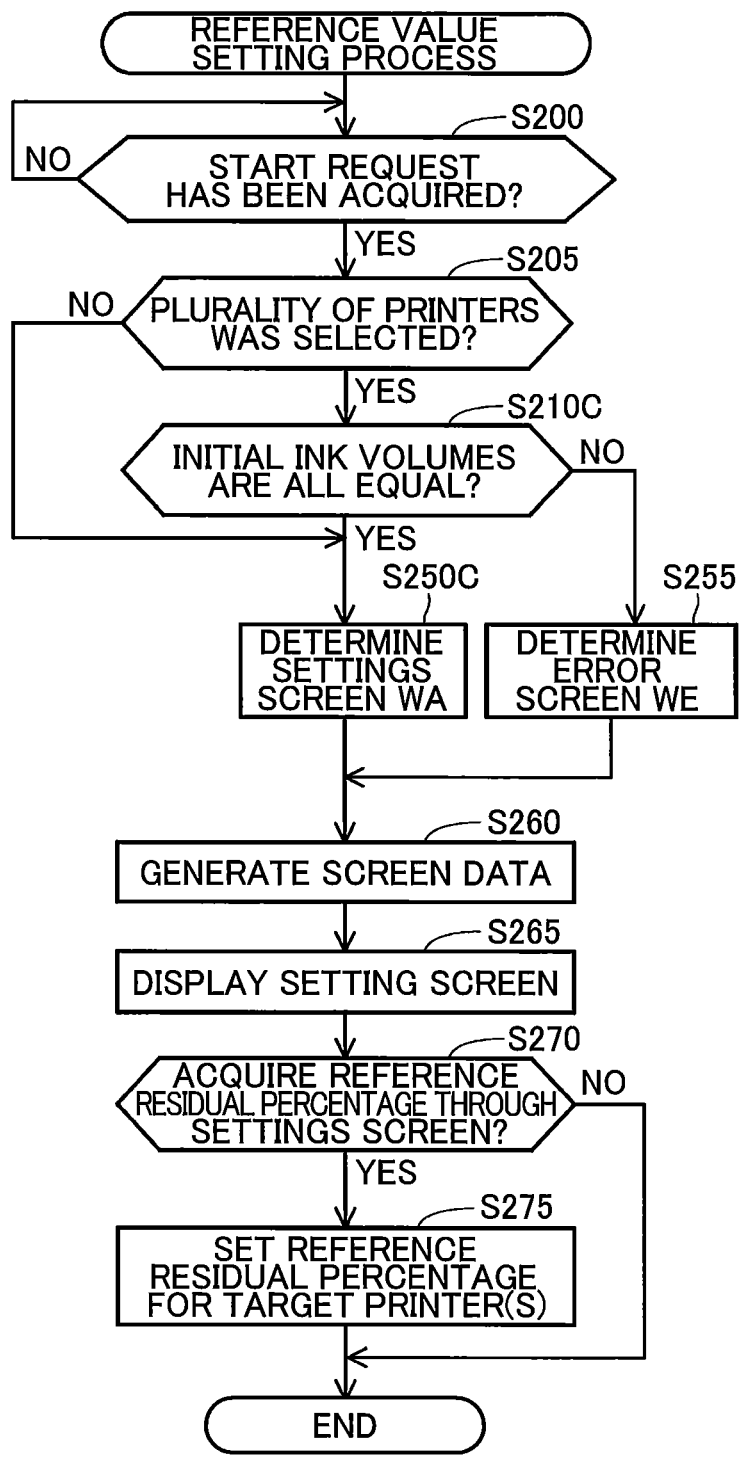
FIG. 16A is a flowchart illustrating steps in a reference value setting process performed by a management server according to still another variation.

FIG. 16A is a flowchart illustrating steps in a reference value setting process according to a variation. This variation assumes that all printers in the system 1000 are printers employing only single-chamber supply systems. The reference value setting process shown in FIG. 16A differs from the process in the first embodiment shown in FIG. 7 in that step S210C is executed in place of step S210 of FIG. 7, step S250C is executed in place of step S250 of FIG. 7, and steps S215-S245 of FIG. 7 are omitted. All other steps in FIG. 16 are identical to steps having the same step numbers in FIG. 7.

In the reference value setting process of FIG. 16A, when a plurality of printers has been selected as target printers (S205: YES), in S210C the management server 300 determines whether the target printers all have the same initial ink volume IV.

When the target printers all have the same initial ink volume IV (S210C: YES), in S250C the management server 300 sets the screen to be displayed to the settings screen WA shown in FIG. 8A. However, when the target printers have initial ink volumes IV of two or more values (S210C: NO), in S255 the management server 300 sets the screen to be displayed to the error screen WE in FIG. 9.

In this variation, the settings screen WA is an example of the first screen; and the error screen WE is an example of the second screen. According to this variation, when a matching condition including the condition that the target printers all have the same initial ink volume IV has been met, the management server 300 determines that all of the target printers have the same type. Thus, the management server 300 can provide the user with a suitable screen depending on whether the initial ink volumes IV of the target printers match.

Figure 16B:
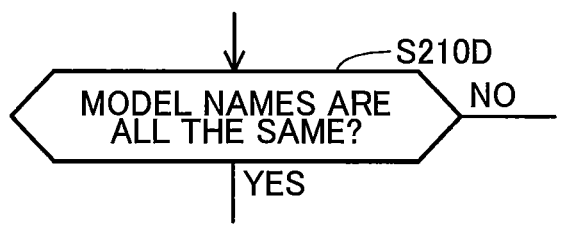
FIG. 16B is a step in a reference value setting process performed by a management server according to still another variation.

(5) As another variation, step S210D shown in FIG. 16B may be executed in place of step S210C in the reference value setting process of FIG. 16A. In S210D the management server 300 determines whether all of the target printers have the same model name (see FIG. 4). When all of the target printers have the same model name (S210D: YES), in S250C the management server 300 sets the screen to be displayed to the settings screen WA shown in FIG. 8A. When the model names of the target printers include two or more different model names (S210D: NO), in S255 the management server 300 sets the screen to be displayed to the error screen WE in FIG. 9. According to this variation, when all of the printers have the same model name, i.e., when all of the target printers have the same device model, the management server 300 determines that all of the target printers have the same type. Hence, the management server 300 can easily determine when the types of the target printers all match based on their model names. Note that the model name can be considered identification information for identifying the device model of the target printer.

(6) The printer 100A used as an example of the processing target printer in the embodiments described above is provided with a monochromatic printing mechanism 171A employing a single ink color (black (K), for example).

However, the printer 100A may be provided with a printing mechanism using multiple colors of ink, such as a printing mechanism capable of printing color images using the four colors of ink; cyan (C), magenta (M), yellow (Y), and black (K). In this case, four ink cartridges 200A corresponding to the four colors of ink can be attached to the print executing unit 170A of the printer 100A.

In the print executing unit 170A according to this variation, the attachment portion 172A, ink supply opening 174A, intermediate container 175A, and ink channel section 177A are provided for each of the four ink colors. The management database PD records, in each entry, four records of ink-related information corresponding to the four ink colors.

In this variation, the management process of FIG. 5 is executed independently for each of the four ink cartridges 200A in a single printer 100A. Further, the settings screen WA displayed by the reference value setting process of FIG. 7 includes four UI images Ia corresponding to the four ink cartridges 200A. This configuration may also be applied to the settings screens WB-WD and WF-WI.

(7) The printer 100A used as an example of the target printer in the embodiments is provided with an inkjet-type print executing unit 170A. However, the printer 100A may instead be provided with a printing mechanism employing an electrophotographic system (laser system, for example) for printing images using toner as the printing agent.

In this case, the print executing unit may be provided with an attachment portion to which a toner cartridge is attachable, a printing mechanism that executes printing operations using the toner accommodated in the toner cartridge attached to the attachment portion, and a container (a subtank for temporarily storing toner, for example) disposed along the path that toner travels from the toner cartridge attached to the attachment portion to the printing mechanism. The management process and reference value setting process described in the embodiments can also be applied to this type of printer provided with a double-chamber supply system for supplying toner.

(8) In the present embodiments described above, when the management server 300 determines that the replenishment condition has been met (S150 and S155 of FIG. 5), the management server 300 sends an order notification (S160 of FIG. 5). As an alternative, the management server 300 may transmit the user-designated reference residual percentage TR to the printer 100A, and the printer 100A may determine whether the replenishment condition is met and may transmit an order notification to the vendor server 400 when the replenishment condition has been met.

As another variation, the printer 100A may determine whether the replenishment condition has been met and, when the condition has been met, may transmit information to the management server 300 indicating that the replenishment condition has been met. In this case, the management server 300 transmits an order notification to the vendor server 400 after receiving the information from the printer 100A specifying that the replenishment condition has been met. Since the management server 300 does not determine whether the replenishment condition is met in this variation, the management server 300 need not acquire the residual ink percentage IR and the acquired status from the printer 100A.

(9) In the first embodiment described above, the management server 300 acquires the initial ink volume IV and boundary ink volume BV from the printer 100A (S100 of FIG. 5) and calculates the boundary residual percentage BR (S120 of FIG. 5). However, the boundary residual percentage BR may be calculated on the printer 100A, and the management server 300 may acquire the boundary residual percentage BR from the printer 100A.

In the second embodiment, the management server 300 acquires the replacement day, boundary ink volume BV, and residual ink percentage IR from the printer 100A (S100B of FIG. 12) and calculates the number of remaining printing days RD and boundary number of printing days BD (S120B and S130B of FIG. 12). However, at least one of the remaining printing days RD and boundary number of printing days BD may be calculated on the printer 100A, and the management server 300 may acquire the at least one of the remaining printing days RD and boundary number of printing days BD from the printer 100A.

(10) In the embodiments described above, ink Ik is replenished in the printer 100A by replacing the ink cartridge 200A. However, if the cartridge is a specific type cartridge that can be refilled with printing agent supplied from a prescribed bottle, for example, the printer may be replenished with printing agent by refilling the cartridge with the printing agent rather than by replacing the cartridge.

(11) In the embodiments described above, the reference value setting process of FIG. 7 is executed when the user inputs a start request via the sub-window SW displayed on the display unit 340. As a variation, the reference value setting process may be executed when a start request is transmitted from the user's terminal device (smartphone, for example) to the management server 300. Alternatively, if a new printer to be managed is detected by the management server 300 when the computer program PG2 is started up, the management server 300 may automatically execute the reference value setting process even though a start request has not been received.

(12) In the embodiments described above, outputting screen data by the management server 300 is performed in a manner that the management server 300 displays a settings screen or an error screen (the settings screen WA in FIG. 9A, for example) on the display unit 340 using the screen data. However, for example, in a case where the reference value setting process is executed in response to a start request from a user terminal device, outputting screen data by the management server 300 may be performed in a manner that the management server 300 transmits the screen data to the user's terminal device. In this case, the settings screen or error screen is displayed on a display of the terminal device, for example, and the terminal device acquires the user-designated reference residual percentage TR or reference number of days TD through the settings screen on the display. Subsequently, the terminal device transmits the acquired reference residual percentage TR or acquired reference number of days TD to the management server 300.

(13) In the embodiments described above, the management server 300 transmits an order notification to the vendor server 400 (S160 of FIGS. 5 and 12) when the replenishment condition is met. Alternatively, when the replenishment condition has been met, the management server 300 may display a notification on the display unit 340 prompting the user to replace the ink cartridge 200A. As another variation, when the replenishment condition has been met, the management server 300 may transmit, to the email address of the user, a notification prompting the user to replace the ink cartridge 200A. In other words, it is preferable that, when the replenishment condition has been met, the user is notified of information triggering replenishment of printing agent, such as the ink Ik.

(14) While the management server 300 is connected to the local area network NT in the above-described embodiments, the management server 300 may be connected to the Internet IT instead. In this case, for example, the plurality of printers (including the printers 100A, 100B, and 100C) in the system 1000 periodically and voluntarily transmit printer information to the management server 300 via the Internet IT.

In this variation, the management server 300 uses this printer information to execute the management process in FIG. 5 or 12. Subsequently, the management server 300 executes the reference value setting process in FIG. 7 or 13 in response to a start request received via the Internet IT from the user's terminal device. In this case, the management server 300 may be a so-called cloud server, for example, that includes a plurality of computers capable of communicating with each other over a network.

(15) In the embodiments described above, part of the configuration implemented in hardware may be replaced with software and, conversely, all or part of the configuration implemented in software may be replaced with hardware.

(16) When all or some of the functions of the present disclosure are implemented with computer programs, the programs may be provided in a state where the programs are stored on a computer-readable storage medium (a non-transitory storage medium, for example). The programs may be used in a state where they are stored in the same storage medium (a computer-readable storage medium) as that at the time of provision. Alternatively, the programs may be used in a state where they are stored in a storage medium (a computer-readable storage medium) different from that at the time of provision. The "computer-readable storage medium" may be a portable storage medium, such as a memory card or CD-ROM; an internal storage device built into the computer, such as any of various ROM or the like; or an external storage device, such as a hard disk drive, connected to the computer.

What is claimed is:

1. A non-transitory computer-readable storage medium storing a set of program instructions for an information-processing apparatus,
   the information-processing apparatus including:
      a processor; and
      a communication interface for communicating with a plurality of printing devices configured to perform printing operations using printing agent,
   the set of program instructions, when executed by the processor, causing the information-processing apparatus to perform:
      (a) acquiring, via the communication interface, a plurality of pieces of device information about respective ones of the plurality of printing devices;
      (b) determining whether two or more printing devices selected from among the plurality of printing devices by a user selection all have the same type on the basis of two or more of the plurality of pieces of device information corresponding to respective ones of the selected two or more of printing devices;
      (c) generating, on the basis of determination made in the (b) determining, screen data representing a screen regarding settings of two or more reference values for respective ones of the selected two or more printing devices, each of the two or more reference values being used to determine whether a replenishment condition for printing agent of the corresponding printing device is met, wherein, when the replenishment condition is met, a notification triggering replenishment of the corresponding printing device with printing agent is made; and
      (d) outputting the screen data generated in the (c) generating,
   wherein, in response to determination being made in the (b) determining that all of the selected two or more printing devices have the same type, the (c) generating generates first screen data as the screen data, the first screen data representing a first screen as the screen, the first screen being a settings screen through which a single common instruction is capable of being inputted, the single common instruction being a user instruction common to all of the two or more reference values, the two or more reference values being set on the basis of the inputted single common instruction, and
   wherein, in response to determination being made in the (b) determining that not all of the selected two or more printing devices have the same type, the (c) generating generates second screen data as the screen data, the second screen data representing a second screen as the screen, the second screen being a screen through which the single common instruction is not capable of being inputted.

2. The non-transitory computer-readable storage medium according to claim 1, wherein the (b) determining determines, when a matching condition is met, that all of the selected two or more printing devices have the same type, the matching condition including a condition that all of the selected two or more printing devices have the same supply system of the printing agent.

3. The non-transitory computer-readable storage medium according to claim 1, wherein the (b) determining includes:
   (b1) determining whether all of the selected two or more printing devices have the same specific supply system of the printing agent, the specific supply system being a supply system employing: an attachment portion to which a cartridge storing printing agent is attachable; a container for receiving the printing agent from the cartridge attached to the attachment portion and storing the received printing agent; and a printing mechanism configured to perform printing operations using the printing agent stored in the container,
   wherein, when the (b1) determining determines that all of the selected two or more printing devices have the same specific supply system, the (b) determining determines that the matching condition is met, wherein, when the two or more printing devices determined to have the same type in the (b) determining includes two or more specific printing devices at least one of whose initial quantities and boundary quantities are different from one another, the first screen represented by the first data generated in the (c) generating includes:
- two or more first indications corresponding to respective ones of the two or more specific printing devices, each of the two or more first indications being an indication regarding the initial quantity and the boundary quantity of the corresponding specific printing device, each of the two or more first indications including an third indication of a boundary index value for the corresponding specific printing device, the boundary index value being the index value corresponding to the boundary quantity of the corresponding specific printing devices, the third indications being arranged at the same position as one another in a specific direction; and
- a second indication indicating two or more reference values designated for respective ones of the two or more specific printing devices by the single common instruction in association with the corresponding first indication, wherein the initial quantity is a quantity of the printing agent initially stored in the cartridge, and wherein the boundary quantity is a total residual quantity at a time of transition from a first state to a second state, the total residual quantity being a total quantity of a first residual quantity and a second residual quantity, the first residual quantity being a quantity of printing agent remaining in the cartridge, the second residual quantity being a quantity of printing agent remaining in the container, the first state being a state in which the printing agent remains both in the cartridge and in the container, the second state being a state in which the printing agent vanishes from the cartridge but remains in the container.

4. The non-transitory computer-readable storage medium according to claim 2, wherein the (b) determining includes:
(b1) determining whether all of the selected two or more printing devices have the same specific supply system of the printing agent, the specific supply system being a supply system employing: an attachment portion to which a cartridge storing printing agent is attachable; a container for receiving the printing agent from the cartridge attached to the attachment portion and storing the received printing agent; and a printing mechanism configured to perform printing operations using the printing agent stored in the container, wherein the reference value is set for an index value indicating a remaining printing period of time corresponding a total residual quantity, the remaining period of time being a period of time for which the printing device can perform printing operations using the total residual quantity of the printing agent without the printing device being replenished with printing agent, the total residual quantity being a total quantity of a first residual quantity and a second residual quantity, the first residual quantity being a quantity of printing agent remaining in the cartridge, the second residual quantity being a quantity of printing agent remaining in the container, and wherein, when the (b1) determining determines that all of the selected two or more printing devices have the same specific supply system, the (b) determining determines, regardless of initial quantities and boundary quantities of the selected two or more printing devices, that the matching condition is met, the initial quantity being a quantity of the printing agent initially stored in the cartridge, the boundary quantity being the total residual quantity at a time of transition from a first state to a second state, the first state being a state in which the printing agent remains both in the cartridge and in the container, the second state being a state in which the printing agent vanishes from the cartridge but remains in the container.

5. The non-transitory computer-readable storage medium according to claim 2, wherein the (b) determining includes:
(b1) determining whether all of the selected two or more printing devices have the same specific supply system of the printing agent, the specific supply system being a supply system employing: an attachment portion to which a cartridge storing printing agent is attachable; a container for receiving the printing agent from the cartridge attached to the attachment portion and storing the received printing agent; and a printing mechanism configured to perform printing operations using the printing agent stored in the container; and
(b2) determining whether all of the selected two or more printing devices have the same boundary quantity, the boundary quantity being a total residual quantity at a time of transition from a first state to a second state, the total residual quantity being a total quantity of a first residual quantity and a second residual quantity, the first residual quantity being a quantity of printing agent remaining in the cartridge, the second residual quantity being a quantity of printing agent remaining in the container, the first state being a state in which the printing agent remains both in the cartridge and in the container, the second state being a state in which the printing agent vanishes from the cartridge but remains in the container, wherein the reference value is set for an index value indicating one of the total residual quantity and a ratio of the total residual quantity to an initial quantity, the initial quantity being a quantity of the printing agent initially stored in the cartridge, and wherein, when the (b1) determining determines that all of the selected two or more printing devices have the same specific supply system and the (b2) determining determines that all of the selected two or more printing devices have the same boundary quantity, the (b) determining determines that the matching condition is met.

6. The non-transitory computer-readable storage medium according to claim 5, wherein, when the two or more printing devices determined to have the same type in the (b) determining includes two or more specific printing devices having the initial quantities different from one another, the first screen represented by the first data generated in the (c) generating includes:
- two or more first indications corresponding to respective ones of the two or more specific printing devices, each of the two or more first indications being an indication regarding the initial quantity and the boundary quantity of the corresponding specific printing device, each of the two or more first indications including an third indication of a boundary index value for the corresponding specific printing device, the boundary index value being the index value corresponding to the boundary quantity of the corresponding specific printing devices, the third indications being arranged at the same position as one another in a specific direction; and a second indication indicating two or more reference values designated for respective ones of the two or more specific printing devices by the single common instruction in association with the corresponding first indication.

7. The non-transitory computer-readable storage medium according to claim 1, wherein the (b) determining determines, when a matching condition is met, that all of the selected two or more printing devices have the same type, the matching condition including a condition that all of the selected two or more printing devices have the same initial quantity of printing agent.

8. The non-transitory computer-readable storage medium according to claim 1, wherein each of the plurality of pieces of device information includes a device model of the corresponding printing device, and
wherein the (b) determining determines, when all of the selected two or more printing devices have the same device model, that all of the selected two or more printing devices have the same type.

9. The non-transitory computer-readable storage medium according to claim 1, wherein the second screen is an error screen indicating that the two or more reference values are capable of being set through the error screen.

10. The non-transitory computer-readable storage medium according to claim 1, wherein the second screen is a settings screen through which two or more user instructions for setting respective ones of the two or more reference values are capable of being inputted, the two or more reference values being set on the basis of the inputted two or more user instructions.

11. An information-processing apparatus comprising:
a communication interface for communicating with a plurality of printing devices configured to perform printing operations using printing agent; and
a controller configured to perform:
(a) acquiring, via the communication interface, a plurality of pieces of device information about respective ones of the plurality of printing devices;
(b) determining whether two or more printing devices selected from among the plurality of printing devices by a user selection all have the same type on the basis of two or more of the plurality of pieces of device information corresponding to respective ones of the selected two or more of printing devices;
(c) generating, on the basis of determination made in the (b) determining, screen data representing a screen regarding settings of two or more reference values for respective ones of the selected two or more printing devices, each of the two or more reference values being used to determine whether a replenishment condition for printing agent of the corresponding printing device is met, wherein, when the replenishment condition is met, a notification triggering replenishment of the corresponding printing device with printing agent is made; and
(d) outputting the screen data generated in the (c) generating,
wherein, in response to determination being made in the (b) determining that all of the selected two or more printing devices have the same type, the (c) generating generates first screen data as the screen data, the first screen data representing a first screen as the screen, the first screen being a settings screen through which a single common instruction is capable of being inputted, the single common instruction being a user instruction common to all of the two or more reference values, the two or more reference values being set on the basis of the inputted single common instruction, and
wherein, in response to determination being made in the (b) determining that not all of the selected two or more printing devices have the same type, the (c) generating generates second screen data as the screen data, the second screen data representing a second screen as the screen, the second screen being a screen through which the single common instruction is not capable of being inputted.

12. The information-processing apparatus according to claim 11, wherein the (b) determining determines, when a matching condition is met, that all of the selected two or more printing devices have the same type, the matching condition including a condition that all of the selected two or more printing devices have the same supply system of the printing agent.

13. The information-processing apparatus according to claim 11, wherein the (b) determining includes:
(b1) determining whether all of the selected two or more printing devices have the same specific supply system of the printing agent, the specific supply system being a supply system employing: an attachment portion to which a cartridge storing printing agent is attachable; a container for receiving the printing agent from the cartridge attached to the attachment portion and storing the received printing agent; and a printing mechanism configured to perform printing operations using the printing agent stored in the container,
wherein, when the (b1) determining determines that all of the selected two or more printing devices have the same specific supply system, the (b) determining determines that the matching condition is met,
wherein, when the two or more printing devices determined to have the same type in the (b) determining includes two or more specific printing devices at least one of whose initial quantities and boundary quantities are different from one another, the first screen represented by the first data generated in the (c) generating includes:
two or more first indications corresponding to respective ones of the two or more specific printing devices, each of the two or more first indications being an indication regarding the initial quantity and the boundary quantity of the corresponding specific printing device, each of the two or more first indications including an third indication of a boundary index value for the corresponding specific printing device, the boundary index value being the index value corresponding to the boundary quantity of the corresponding specific printing devices, the third indications being arranged at the same position as one another in a specific direction; and
a second indication indicating two or more reference values designated for respective ones of the two or more specific printing devices by the single common instruction in association with the corresponding first indication,
wherein the initial quantity is a quantity of the printing agent initially stored in the cartridge, and
wherein the boundary quantity is a total residual quantity at a time of transition from a first state to a second state, the total residual quantity being a total quantity of a first residual quantity and a second residual quantity, the first residual quantity being a quantity of printing agent remaining in the cartridge, the second residual quantity being a quantity of printing agent remaining in the container, the first state being a state in which the printing agent remains both in the cartridge and in the container, the second state being a state in which the printing agent vanishes from the cartridge but remains in the container.

14. The information-processing apparatus according to claim 12, wherein the (b) determining includes:
(b1) determining whether all of the selected two or more printing devices have the same specific supply system of the printing agent, the specific supply system being a supply system employing: an attachment portion to which a cartridge storing printing agent is attachable; a container for receiving the printing agent from the cartridge attached to the attachment portion and storing the received printing agent; and a printing mechanism configured to perform printing operations using the printing agent stored in the container,
wherein the reference value is set for an index value indicating a remaining printing period of time corresponding a total residual quantity, the remaining period of time being a period of time for which the printing device can perform printing operations using the total residual quantity of the printing agent without the printing device being replenished with printing agent, the total residual quantity being a total quantity of a first residual quantity and a second residual quantity, the first residual quantity being a quantity of printing agent remaining in the cartridge, the second residual quantity being a quantity of printing agent remaining in the container, and
wherein, when the (b1) determining determines that all of the selected two or more printing devices have the same specific supply system, the (b) determining determines, regardless of initial quantities and boundary quantities of the selected two or more printing devices, that the matching condition is met, the initial quantity being a quantity of the printing agent initially stored in the cartridge, the boundary quantity being the total residual quantity at a time of transition from a first state to a second state, the first state being a state in which the printing agent remains both in the cartridge and in the container, the second state being a state in which the printing agent vanishes from the cartridge but remains in the container.

15. The information-processing apparatus according to claim 12, wherein the (b) determining includes:
(b1) determining whether all of the selected two or more printing devices have the same specific supply system of the printing agent, the specific supply system being a supply system employing: an attachment portion to which a cartridge storing printing agent is attachable; a container for receiving the printing agent from the cartridge attached to the attachment portion and storing the received printing agent; and a printing mechanism configured to perform printing operations using the printing agent stored in the container; and
(b2) determining whether all of the selected two or more printing devices have the same boundary quantity, the boundary quantity being a total residual quantity at a time of transition from a first state to a second state, the total residual quantity being a total quantity of a first residual quantity and a second residual quantity, the first residual quantity being a quantity of printing agent remaining in the cartridge, the second residual quantity being a quantity of printing agent remaining in the container, the first state being a state in which the printing agent remains both in the cartridge and in the container, the second state being a state in which the printing agent vanishes from the cartridge but remains in the container,
wherein the reference value is set for an index value indicating one of the total residual quantity and a ratio of the total residual quantity to an initial quantity, the initial quantity being a quantity of the printing agent initially stored in the cartridge, and
wherein, when the (b1) determining determines that all of the selected two or more printing devices have the same specific supply system and the (b2) determining determines that all of the selected two or more printing devices have the same boundary quantity, the (b) determining determines that the matching condition is met.

16. The information-processing apparatus according to claim 15, wherein, when the two or more printing devices determined to have the same type in the (b) determining includes two or more specific printing devices having the initial quantities different from one another, the first screen represented by the first data generated in the (c) generating includes:
two or more first indications corresponding to respective ones of the two or more specific printing devices, each of the two or more first indications being an indication regarding the initial quantity and the boundary quantity of the corresponding specific printing device, each of the two or more first indications including an third indication of a boundary index value for the corresponding specific printing device, the boundary index value being the index value corresponding to the boundary quantity of the corresponding specific printing devices, the third indications being arranged at the same position as one another in a specific direction; and
a second indication indicating two or more reference values designated for respective ones of the two or more specific printing devices by the single common instruction in association with the corresponding first indication.

17. The information-processing apparatus according to claim 11, wherein the (b) determining determines, when a matching condition is met, that all of the selected two or more printing devices have the same type, the matching condition including a condition that all of the selected two or more printing devices have the same initial quantity of printing agent.

18. The information-processing apparatus according to claim 11, wherein each of the plurality of pieces of device information includes a device model of the corresponding printing device, and
wherein the (b) determining determines, when all of the selected two or more printing devices have the same device model, that all of the selected two or more printing devices have the same type.

19. A method of generating and outputting screen data representing a screen about settings of printing devices, comprising:
(a) acquiring a plurality of pieces of device information about respective ones of the plurality of printing devices;
(b) determining whether two or more printing devices selected from among the plurality of printing devices by a user selection all have the same type on the basis of two or more of the plurality of pieces of device information corresponding to respective ones of the selected two or more of printing devices;
(c) generating, on the basis of determination made in the (b) determining, screen data representing a screen regarding settings of two or more reference values for respective ones of the selected two or more printing devices, each of the two or more reference values being used to determine whether a replenishment condition for printing agent of the corresponding printing device is met, wherein, when the replenishment condition is met, a notification triggering replenishment of the corresponding printing device with printing agent is made; and (d) outputting the screen data generated in the (c) generating, wherein, in response to determination being made in the (b) determining that all of the selected two or more printing devices have the same type, the (c) generating generates first screen data as the screen data, the first screen data representing a first screen as the screen, the first screen being a settings screen through which a single common instruction is capable of being inputted, the single common instruction being a user instruction common to all of the two or more reference values, the two or more reference values being set on the basis of the inputted single common instruction, and wherein, in response to determination being made in the (b) determining that not all of the selected two or more printing devices have the same type, the (c) generating generates second screen data as the screen data, the second screen data representing a second screen as the screen, the second screen being a screen through which the single common instruction is not capable of being inputted.

* * * * *